United States Patent
Zhou et al.

(10) Patent No.: US 12,267,703 B2
(45) Date of Patent: Apr. 1, 2025

(54) TECHNIQUES FOR BEAM FAILURE DETECTION AND RECOVERY

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 17/503,087

(22) Filed: Oct. 15, 2021

(65) Prior Publication Data

US 2023/0121399 A1 Apr. 20, 2023

(51) Int. Cl.
*H04W 24/04* (2009.01)
*H04B 7/06* (2006.01)

(52) U.S. Cl.
CPC ........ *H04W 24/04* (2013.01); *H04B 7/06964* (2023.05)

(58) Field of Classification Search
CPC .. H04B 7/0628; H04B 7/06964; G06N 20/20; G06F 18/20; H04W 24/04; H04W 74/0838; H04W 8/24; H04W 74/0833; H04W 76/19
See application file for complete search history.

(56) References Cited

U.S. PATENT DOCUMENTS

| | | | |
|---|---|---|---|
| 2019/0082334 A1* | 3/2019 | Nagaraja | H04W 76/19 |
| 2020/0314942 A1* | 10/2020 | Bai | H04W 76/15 |
| 2020/0413273 A1* | 12/2020 | Turtinen | H04W 76/28 |
| 2021/0235292 A1* | 7/2021 | Zhang | H04B 7/088 |
| 2021/0409091 A1* | 12/2021 | Svedman | H04W 72/23 |
| 2021/0410144 A1* | 12/2021 | da Silva | H04W 72/0453 |
| 2022/0046740 A1* | 2/2022 | Lo | H04W 76/19 |
| 2022/0109488 A1* | 4/2022 | Nam | H04B 7/088 |
| 2022/0132517 A1* | 4/2022 | Zhu | H04L 5/0094 |
| 2022/0173788 A1* | 6/2022 | Kang | H04L 1/1864 |
| 2022/0361012 A1* | 11/2022 | Park | H04W 72/54 |
| 2023/0041404 A1* | 2/2023 | Zhou | H04W 8/22 |
| 2023/0053871 A1* | 2/2023 | Tran | H04B 7/088 |
| 2023/0121399 A1* | 4/2023 | Zhou | H04B 7/06964 370/216 |

(Continued)

*Primary Examiner* — Ricky Q Ngo
*Assistant Examiner* — Kabir U Jahangir
(74) *Attorney, Agent, or Firm* — Holland & Hart LLP

(57) ABSTRACT

This disclosure provides systems, methods and apparatus, including computer programs encoded on computer storage media, for techniques for beam failure detection and recovery. A UE may support autonomous determination of a beam failure timer for a beam failure procedure, such as a beam failure detection (BFD) timer for a BFD procedure or a beam failure recovery (BFR) timer for a BFR procedure. For example, a network entity may transmit reference signals to the UE that are associated with the beam failure procedure. For instance, the UE may measure the reference signals as part of a BFD procedure or may initiate a BFR procedure in response to receiving the reference signals. The UE may determine a timer value for the beam failure timer using, for example, a machine learning (ML) model or a mapping and may perform the beam failure procedure in accordance with the UE-determined beam failure timer.

27 Claims, 15 Drawing Sheets

(56) References Cited

U.S. PATENT DOCUMENTS

2023/0131188 A1* 4/2023 Hu .................. H04L 5/0053
370/329
2023/0269811 A1 8/2023 Shibaike et al.
2023/0354453 A1* 11/2023 Uesaka ............ H04W 72/1268

* cited by examiner

TECHNIQUES FOR BEAM FAILURE DETECTION AND RECOVERY

TECHNICAL FIELD

This disclosure relates to wireless communications, including techniques for beam failure detection and recovery.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include receiving, from a network entity, one or more reference signals in accordance with a configuration associated with a beam failure procedure and performing the beam failure procedure, the beam failure procedure including initiating a beam failure timer in response to one or more measurements of the one or more reference signals by the UE, where the beam failure timer is determined by the UE and the beam failure timer includes one of a beam failure detection (BFD) timer or a beam failure recovery (BFR) timer.

Another innovative aspect of the subject matter described in this disclosure can be implemented in an apparatus for wireless communications at a UE. The apparatus may include a first interface and a processing system. The first interface may be configured to obtain, for a UE and from a network entity, one or more reference signals in accordance with a configuration associated with a beam failure procedure. The processing system may be configured to perform the beam failure procedure, the beam failure procedure including initiating a beam failure timer in response to one or more measurements of the one or more reference signals by the UE, where the beam failure timer is determined by the UE and the beam failure timer includes one of a BFD timer or a BFR timer.

Another innovative aspect of the subject matter described in this disclosure can be implemented in another apparatus for wireless communications at a UE. The apparatus may include a processor, memory coupled with the processor, and instructions stored in the memory. The instructions may be executable by the processor to cause the apparatus to receive, from a network entity, one or more reference signals in accordance with a configuration associated with a beam failure procedure and perform the beam failure procedure, the beam failure procedure including initiating a beam failure timer in response to one or more measurements of the one or more reference signals by the UE, where the beam failure timer is determined by the UE and the beam failure timer includes one of a BFD timer or a BFR timer.

Another innovative aspect of the subject matter described in this disclosure can be implemented in another apparatus for wireless communications at a UE. The apparatus may include means for receiving, from a network entity, one or more reference signals in accordance with a configuration associated with a beam failure procedure and means for performing the beam failure procedure, the beam failure procedure including initiating a beam failure timer in response to one or more measurements of the one or more reference signals by the UE, where the beam failure timer is determined by the UE and the beam failure timer includes one of a BFD timer or a BFR timer.

Another innovative aspect of the subject matter described in this disclosure can be implemented in a non-transitory computer-readable medium storing code for wireless communications at a UE. The code may include instructions executable by a processor to receive, from a network entity, one or more reference signals in accordance with a configuration associated with a beam failure procedure and perform the beam failure procedure, the beam failure procedure including initiating a beam failure timer in response to one or more measurements of the one or more reference signals by the UE, where the beam failure timer is determined by the UE and the beam failure timer includes one of a BFD timer or a BFR timer.

Some examples of the method, apparatuses, and non-transitory computer-readable medium described herein may further include operations, features, means, or instructions for determining, by the UE, a timer value for the beam failure timer using a machine learning (ML) model.

Some examples of the method, apparatuses, and non-transitory computer-readable medium described herein may further include operations, features, means, or instructions for determining, by the UE, a timer value for the beam failure timer using a mapping that maps parameters associated with the beam failure procedure to timer values of beam failure timers.

Some examples of the method, apparatuses, and non-transitory computer-readable medium described herein may further include operations, features, means, or instructions for transmitting, to the network entity, a capability message indicating one or more capabilities of the UE associated with determining a timer value for the beam failure timer, where the timer value for the beam failure timer may be determined by the UE based on the one or more capabilities of the UE.

Some examples of the method, apparatuses, and non-transitory computer-readable medium described herein may further include operations, features, means, or instructions for receiving, from the network entity, a message that activates determination by the UE of timer values for beam failure timers for one or more beam failure procedures, the one or more beam failure procedures including the beam failure procedure, where a timer value for the beam failure timer may be determined by the UE in response to receiving the message.

One innovative aspect of the subject matter described in this disclosure can be implemented in a method for wireless communications at a network entity. The method may include transmitting, to a UE, an indication of one or more configurations for determination, by the UE, of one or more timer values for one or more beam failure timers associated with a beam failure procedure and transmitting, to the UE, one or more reference signals for measurement by the UE as part of the beam failure procedure.

Another innovative aspect of the subject matter described in this disclosure can be implemented in an apparatus for wireless communications at a network entity. The apparatus may include a first interface. The first interface may be configured to output, from a network entity to a UE, an indication of one or more configurations for determination, by the UE, of one or more timer values for one or more beam failure timers associated with a beam failure procedure and output, from the network entity to the UE, one or more reference signals for measurement by the UE as part of the beam failure procedure.

Another innovative aspect of the subject matter described in this disclosure can be implemented in another apparatus for wireless communications at a network entity. The apparatus may include a processor, memory coupled with the processor, and instructions stored in the memory. The instructions may be executable by the processor to cause the apparatus to transmit, to a UE, an indication of one or more configurations for determination, by the UE, of one or more timer values for one or more beam failure timers associated with a beam failure procedure and transmit, to the UE, one or more reference signals for measurement by the UE as part of the beam failure procedure.

Another innovative aspect of the subject matter described in this disclosure can be implemented in another apparatus for wireless communications at a network entity. The apparatus may include means for transmitting, to a UE, an indication of one or more configurations for determination, by the UE, of one or more timer values for one or more beam failure timers associated with a beam failure procedure and means for transmitting, to the UE, one or more reference signals for measurement by the UE as part of the beam failure procedure.

Another innovative aspect of the subject matter described in this disclosure can be implemented in a non-transitory computer-readable medium storing code for wireless communications at a network entity. The code may include instructions executable by a processor to transmit, to a UE, an indication of one or more configurations for determination, by the UE, of one or more timer values for one or more beam failure timers associated with a beam failure procedure and transmit, to the UE, one or more reference signals for measurement by the UE as part of the beam failure procedure.

In some examples of the method, apparatuses, and non-transitory computer-readable medium described herein, the one or more configurations for the determination include one or more ML models for beam failure timer value determination.

In some examples of the method, apparatuses, and non-transitory computer-readable medium described herein, the one or more configurations for the determination include one or more mappings that map parameters associated with the beam failure procedure to timer values of beam failure timers.

Some examples of the method, apparatuses, and non-transitory computer-readable medium described herein may further include operations, features, means, or instructions for receiving, from the UE, a capability message indicating one or more capabilities of the UE associated with determining the one or more timer values for the one or more beam failure timers, where the one or more configurations for the determination may be based on the one or more capabilities of the UE.

Some examples of the method, apparatuses, and non-transitory computer-readable medium described herein may further include operations, features, means, or instructions for transmitting, to the UE, a message that activates the determination, by the UE, of the one or more timer values for the one or more beam failure timers.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
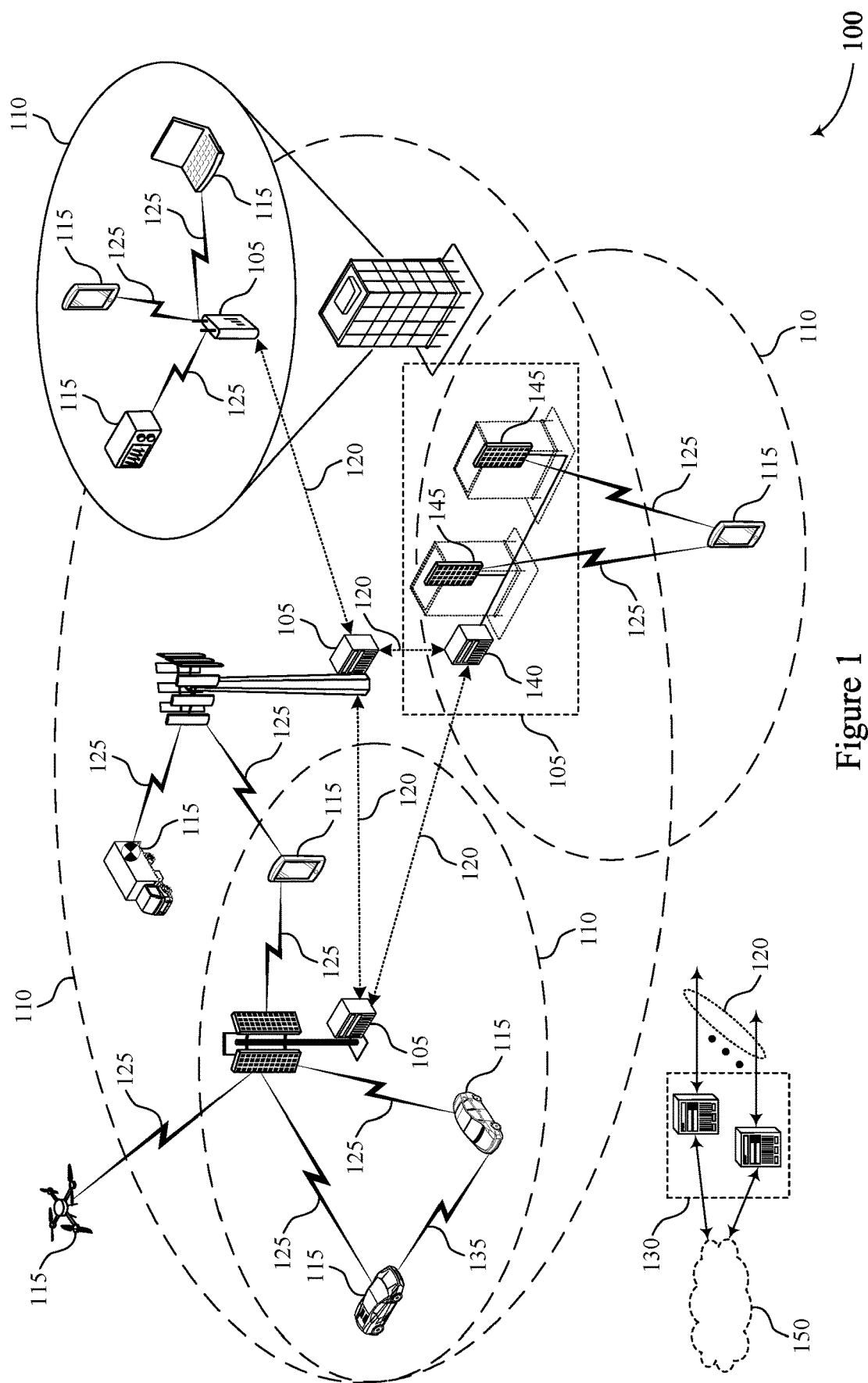
FIG. 1 illustrates an example of a wireless communications system that supports techniques for beam failure detection and recovery.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing third generation (3G), fourth generation (4G) or fifth generation (5G), or further implementations thereof, technology.

Some wireless communications systems may support beamformed communications between communication devices using one or more beams, such as between a user equipment (UE) and a network entity (such as one or more components of a base station (BS), which may be co-located, geographically distributed, or virtually distributed). In some implementations, a UE may perform a beam failure procedure to support beamformed communications. For example, the UE may perform a beam failure detection (BFD) procedure to determine whether a beam used to communicate with the network entity has failed. Additionally, or alternatively, the UE may perform a beam failure recovery (BFR) procedure (such as in response to determining that beam failure has occurred) to re-establish a connection with the network entity and select one or more new beams to use to communicate with the network entity. In some implementations, the UE may perform a beam failure procedure in accordance with a beam failure timer that has a timer value (for example, a duration) configured (for example, set) by the network entity. However, in some implementations, channel conditions between the UE and the network entity may change, and the configured beam failure timers may not be suitable for current channel conditions. Because the UE may measure the channel conditions, efficient techniques for reporting changing channel conditions to the network entity and reconfiguring beam failure timers accordingly may be non-existent. As a result, beam failure procedures performed in accordance with beam failure timers configured by the network entity may, in some implementations, suffer reduced reliability and increased latency.

Techniques, systems, and devices are described herein for enabling UE determination of beam failure timers for beam failure procedures. For example, a UE may be configured to autonomously (such as without timer configurations or assistance from a network entity) determine a timer value for a beam failure timer associated with a beam failure procedure (such as a BFD timer associated with a BFD procedure or a BFR timer associated with a BFR procedure). That is, the UE may receive, select, ascertain or determine the timer value for the beam failure timer rather than using a timer value configured by a network entity. In some implementations, the UE may receive, select, ascertain or determine the timer value for the beam failure timer using a machine learning (ML) model, for example, by inputting a set of parameters associated with the beam failure procedure into the ML model, which may output the timer value for the beam failure timer. In some other implementations, the UE may receive, select, ascertain or determine the timer value for the beam failure timer using a mapping (such as a lookup table) that maps the set of parameters to the timer value for the beam failure timer.

The UE may perform the beam failure procedure in accordance with the determined timer value for the beam failure timer. For example, to perform a BFD procedure in accordance with a BFD timer determined by the UE, the UE may initiate the BFD timer in response to receiving, from a network entity using a beam, one or more reference signals associated with the BFD procedure (such as BFD-reference signals (BFD-RSs). In some implementations, the UE may estimate a block error rate (BLER) of each of the one or more reference signals and may generate a beam failure indicator (BFI) for each reference signal having an estimated BLER that satisfies (for example, meets or exceeds) a threshold BLER. If the UE generates a threshold quantity of BFIs before an expiration of the BFD timer, the UE may indicate or otherwise declare beam failure. Otherwise, upon expiration of the BFD timer, the UE may determine that the beam has not failed.

Additionally, or alternatively, to perform a BFR procedure in accordance with a BFR timer determined by the UE, the UE may initiate the BFR procedure in response to determining that beam failure has occurred and may initiate the BFR timer. Prior to expiration of the BFR timer, the UE may perform one or more contention free random access (CFRA) procedure to attempt to re-establish a connection with the network entity. If the UE fails to re-establish the connection via the one or more CFRA procedures, upon expiration of the BFR timer, the UE may perform one or more contention based random access (CBRA) procedures to attempt to re-establish the connection until the connection is re-established.

Particular implementations of the subject matter described in this disclosure can be implemented to realize one or more of the following potential advantages. For example, the operations performed by a UE and a network entity described herein may reduce latency associated with performing beam failure procedures by dynamically selecting, ascertaining, obtaining, adjusting, or determining beam failure timer values according to current channel conditions, a BFI reporting history (such as a quantity of BFIs generated within a past duration), available CFRA preambles, or a combination thereof. For instance, if current channel conditions indicate relatively reliable communications over a beam or if a BFI reporting history indicates a relatively small quantity of recently generated BFIs, beam failure may be less likely to occur and a UE may select a BFD timer having a smaller timer value relative to a BFD timer configured by the network entity in order to reduce a duration of a BFD procedure. Additionally, performing a CFRA procedure may be associated with a lower latency compared to performing a CBRA procedure. Accordingly, a UE may select larger BFR timers as a quantity of available CFRA preambles increases, thereby enabling the UE to perform a larger quantity of CFRA procedures prior to expiration of the BFR timer, thus increasing a likelihood that a BFR procedure will be successfully completed via a CFRA procedure rather than a CBRA procedure.

Additionally, or alternatively, the operations performed by a UE and a network entity described herein may increase a reliability (for example, an accuracy) of performing beam failure procedures by enabling the dynamic selecting, obtaining, ascertaining, adjusting, or determining of beam failure timers. For example, if current channel conditions indicate relatively unreliable communications over a beam or if a BFI reporting history indicates a relatively large quantity of recently generated BFIs, beam failure may be more likely to occur. Accordingly, and a UE may select a BFD timer having a larger timer value relative to a BFD timer configured by the network entity in order to increase a duration of a BFD procedure, thereby granting the UE additional time to determine whether beam failure has occurred.

FIG. 1 illustrates an example of a wireless communications system 100 that supports techniques for beam failure detection and recovery. The wireless communications system 100 may include one or more BSs 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (for example, mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a coverage area 110 over which the UEs 115 and the BS 105 may establish one or more communication links 125. The coverage area 110 may be an example of a geographic area over which a BS 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (for example, core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (for example, via an S1, N2, N3, or another interface). The BSs 105 may communicate with one another over the backhaul links 120 (for example, via an X2, Xn, or another interface) either directly (for example, directly between BSs 105), or indirectly (for example, via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation (CA) or multi-carrier operation. A UE 115 may be configured with multiple downlink component carriers and one or more uplink component carriers according to a CA configuration. CA may be used with both frequency division duplexing (FDD) and time division duplexing (TDD) component carriers.

The communication links 125 shown in the wireless communications system 100 may include uplink transmissions from a UE 115 to a BS 105, or downlink transmissions from a BS 105 to a UE 115. Carriers may carry downlink or uplink communications (for example, in an FDD mode) or may be configured to carry downlink and uplink communications (for example, in a TDD mode).

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, where the symbol period and subcarrier spacing are inversely related. The quantity of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some implementations, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some implementations, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORE-SETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof. The term "cell" may refer to a logical communication entity used for communication with a BS 105 (for example, over a carrier) and may be associated with an identifier for distinguishing neighboring cells (for example, a physical cell identifier (PCID), a virtual cell identifier (VCID), or others). In some implementations, a cell also may refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the BS 105. For example, a cell may be or include a building, a subset of a building, or exterior spaces between or overlapping with geographic coverage areas 110, among other implementations.

A macro cell generally covers a relatively large geographic area (for example, several kilometers in radius) and may allow unrestricted access by the UEs 115 with service subscriptions with the network provider supporting the macro cell. A small cell may be associated with a lower-powered BS 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A BS 105 may support one or multiple cells and also may support communications over the one or more cells using one or multiple component carriers.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1:M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (for example, radio heads and ANCs) or consolidated into a single network device (for example, a BS 105). In various implementations, a BS 105, or an access network entity 140, or a core network 130, or some subcomponent thereof, may be referred to as a network entity.

As described herein, a BS 105 may include components that are located at a single physical location or components located at various physical locations. In examples in which the BS 105 includes components that are located at various physical locations, the various components may each perform various functions such that, collectively, the various components achieve functionality that is similar to a BS 105 that is located at a single physical location. As such, a BS 105 described herein may equivalently refer to a standalone BS 105 or a BS 105 including components that are located at various physical locations or virtualized locations. In some implementations, such a BS 105 including components that are located at various physical locations may be referred to as or may be associated with a disaggregated radio access network (RAN) architecture, such as an Open RAN (O-RAN) or Virtualized RAN (VRAN) architecture. In some implementations, such components of a BS 105 may include or refer to one or more of a central unit (CU), a distributed unit (DU), or a radio unit (RU).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be based on a CA configuration in conjunction with component carriers operating in a licensed band (for example, LAA). Operations in unlicensed spectrum may include downlink transmissions, uplink transmissions, P2P transmissions, or D2D transmissions, among other transmissions.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (for example, a BS 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A BS 105 or a UE 115 may use beam sweeping techniques as part of beam forming operations. For example, a BS 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (for example, by a transmitting device, such as a BS 105, or by a receiving device, such as a UE 115) a beam direction for later transmission or reception by the BS 105.

Some signals, such as data signals associated with a particular receiving device, may be transmitted by a BS 105 in a single beam direction (for example, a direction associated with the receiving device, such as a UE 115). In some implementations, the beam direction associated with transmissions along a single beam direction may be determined based on a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some implementations, transmissions by a device (for example, by a BS 105 or a UE 115) may be performed using multiple beam directions, and the device may use a combination of digital precoding or radio frequency beamforming to generate a combined beam for transmission (for example, from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the BS 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some implementations, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the physical layer, transport channels may be mapped to physical channels.

To support beamformed communications, a UE 115 and one or more components of a BS 105 may perform beam failure procedure, such as BFD procedures or BFR procedures. For example, various factors, such as interference or noise, may cause a beam used by the UE 115 or the one or more components of the BS 105 to fail such that signals communicated using the beam may suffer reduced quality and, in some implementations, may not be properly decoded. Accordingly, the UE 115 and the one or more components of the BS 105 may discontinue communicating using the beam and may perform a BFR procedure during which one or more new beams may be selected (and indicated) for communicating.

In order to detect a failure of a beam, a UE 115 may perform a BFD procedure. For example, one or more components of a BS 105 may transmit reference signals, such as BFD-RSs, that may enable the UE 115 to determine whether beam failure has occurred. In some implementations, BFD-RSs may be periodic reference signals (such as periodic CSI-RSs, periodic synchronization signal blocks (SSBs)) transmitted over configured time periods. To determine whether beam failure has occurred, the UE 115 may perform one or more channel measurements on the BFD-RSs and may compare or determine, at a physical layer at the UE 115, whether the one or more channel measurements satisfy a measurement threshold. If the one or more channel measurements satisfy the measurement threshold, the physical layer at the UE 115 may report a BFI to a MAC layer at the UE 115. In some implementations, the measurement threshold may be a threshold BLER (such as a 10% BLER), and a trigger condition for reporting the BFI may be that an estimated BLER of a BFD-RS satisfies the threshold BLER (such as having an estimated BLER based on a signal-to-interference-plus-noise ratio (SINR) measurement of the BFD-RS that meets or exceeds the threshold BLER). The MAC layer may maintain a count of the BFIs received from the physical layer, and, if the quantity of BFIs received from the physical layer satisfies (such as meets, crosses, or exceeds) a threshold quantity before an expiration of a BFD timer, the MAC layer may trigger the UE 115 to declare beam failure and transmit a beam failure report to the one or more components of the BS 105 (such as an indication that beam failure has occurred).

In response to the beam failure report, the UE 115 and the one or more components of the BS 105 may perform a BFR procedure to re-establish communications between the UE 115 and the one or more components of the BS 105. For example, the UE 115 and the one or more components of the BS 105 may perform the BFR procedure to select (and configure) one or more new beams for communicating messages between the UE 115 and the one or more components of the BS 105. To perform the BFR procedure, the UE 115 may initiate a BFR timer and may perform, while the BFR timer is running, one or more CFRA procedures using one or more corresponding CFRA preambles to attempt to re-establish communications with the one or more components of the BS 105. If the UE 115 fails to re-establish the communications with the one or more components of the BS 105 via the one or more CFRA procedures, upon expiration of the BFR timer, the UE 115 may switch from performing CFRA procedures to performing CBRA procedures to re-establish communications with the one or more components of the BS 105 until the communications are re-established.

The wireless communications system 100 may support enhanced beam failure detection and recovery techniques. For example, a UE 115 may support UE determination of BFD timer values and BFR timer values. For instance, the UE 115 may be configured (for example, activated) to autonomously determine a timer value for a BFD timer or a BFR timer, or both, as described with reference to FIGS. 4 and 5. In other words, the UE 115 may determine the timer value for the BFD timer or the BFR timer rather than using a timer value configured by one or more components of a BS 105. In some implementations, the UE 115 may determine the timer value for the BFD timer or the BFR timer using an ML model, for example, by inputting a set of parameters associated with the BFD procedure or the BFR procedure, respectively, into the ML model, which may output the timer value. In some other implementations, the UE 115 may determine the timer value for the BFD timer or the BFR timer using a mapping (such as a lookup table) that maps the set of parameters to the timer value.

Figure 2:
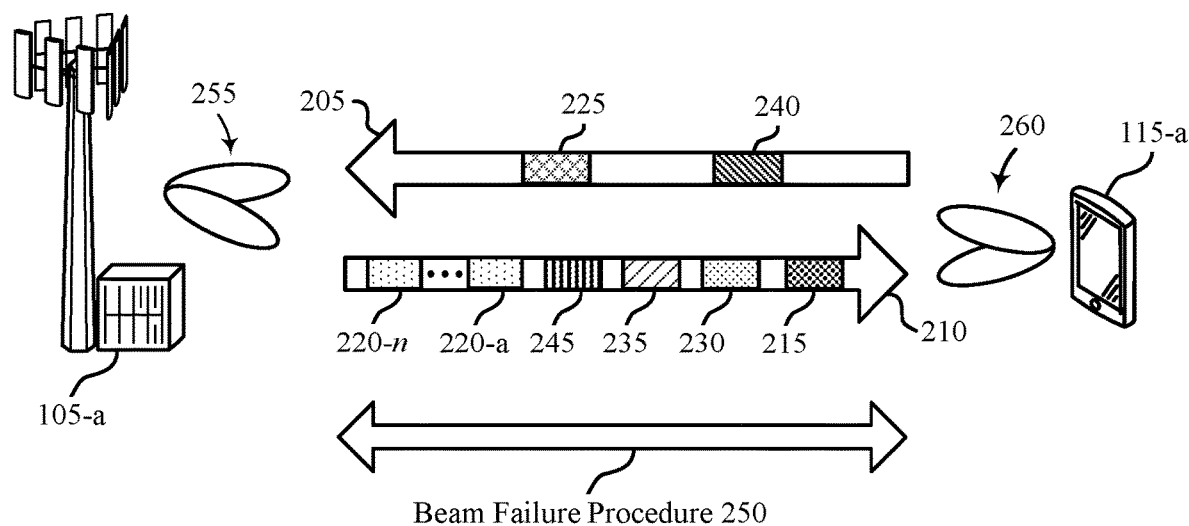
FIG. 2 illustrates an example of a signaling diagram that supports techniques for beam failure detection and recovery.
Figure 2:
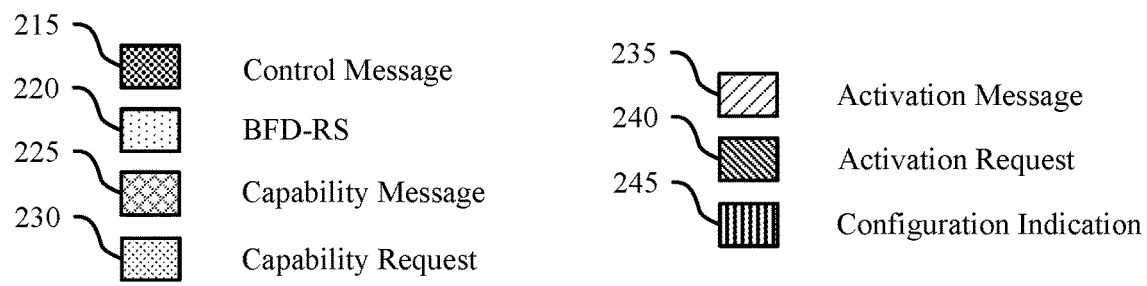

FIG. 2 illustrates an example of a signaling diagram 200 that supports techniques for beam failure detection and recovery. The signaling diagram 200 may implement or be implemented by aspects of the wireless communications system 100. For example, the signaling diagram 200 may include a BS 105 a and a UE 115-a. The UE 115-a may represent an example of a UE 115 as described herein, including with reference to FIG. 1. The BS 105-a may represent an example of a BS 105 as described herein, including with reference to FIG. 1. In some implementations, the signaling diagram 200 may implement multiple radio access technologies including 4G systems and 5G systems which may be referred to as NR systems. The signaling diagram 200 may support UE beam failure timer determination to increase beam failure procedure reliability and accuracy and reduce beam failure procedure latency, among other benefits.

The signaling diagram 200 may support communications between the UE 115-a and one or more components of the BS 105-a. For example, the UE 115-a may transmit uplink messages to the one or more components of the BS 105-a over a communication link 205 (which may be an example of a communication link 125 described with reference to FIG. 1) and may receive downlink messages on a communication link 210 (which may be an example of a communication link 125).

The signaling diagram 200 may additionally support beamformed communications between the one or more components of the BS 105-a and the UE 115-a. For example, the one or more components of the BS 105-a may transmit and receive messages using one or more of a set of BS beams 255, and the UE 115-a may transmit and receive messages using one or more of a set of UE beams 260. To support the beamformed communications, the one or more components of the BS 105-a and the UE 115-a may support performing a beam failure procedure 250, for example, to determine whether a BS beam 255 or a UE beam 260 has failed, to re-establish communications between the UE 115-a and the one or more components of the BS 105-a in the event that beam failure has occurred, or both. For example, in some implementations, the beam failure procedure 250 may be an example of a BFD procedure during which the UE 115-a may determine whether beam failure has occurred. In some implementations, the beam failure procedure 250 may be an example of a BFR procedure during which the UE 115-a and the one or more components of the BS 105-a may re-establish communications, for example, via performing one or more random access procedures and may select one or more new beams for communicating downlink messages and uplink messages.

To support the beam failure procedure 250, the one or more components of the BS 105-a may transmit one or more BFD-RSs 220 to the UE 115-a, for example, according to a configuration associated with the beam failure procedure 250. For example, the one or more components of the BS 105-a may transmit, as part of a BFD procedure, BFD-RSs 220 to the UE 115-a during periodically configured time periods, such as a BFD-RS 220-a through a BFD-RS 220-n each transmitted during a different periodic time period. In some implementations, the UE 115-a may measure the BFD-RSs 220 and may generate BFIs corresponding to one or more of the BFD-RSs 220 to determine whether beam failure has occurred as part of the BFD procedure. In some implementations, if the UE 115-a determines that beam failure has occurred, the UE 115-a may initiate a BFR procedure with the one or more components of the BS 105-a to re-establish a connection with the one or more components of the BS 105-a.

The UE 115-a may perform the beam failure procedure 250 in accordance with a beam failure timer. For example, the UE 115-a may perform a BFD procedure in accordance with a BFD timer. Here, the UE 115-a may initiate the BFD timer, for example, in response to receiving the BFD-RS 220-a and may generate and report BFIs to a MAC layer while the BFD timer runs. If the UE 115-a generates and reports a threshold quantity of BFIs before an expiration of the BFD timer, the UE 115-a may determine that beam failure has occurred. Alternatively, upon expiration of the timer, the UE 115-a may determine that beam failure has not occurred if the UE 115-a does not generate and reports the threshold quantity of BFIs. Additionally, or alternatively, the UE 115-a may perform a BFR procedure in accordance with a BFR timer. Here, the UE 115-a may initiate the BFR timer in response to determining that beam failure has occurred and may perform one or more CFRA procedures with the one or more components of the BS 105-a while the BFR timer runs. If communications fail to be re-established via the one or more CFRA procedure, upon expiration of the BFR timer, the UE 115-a may perform one or more CBRA procedures with the one or more components of the BS 105-a until communications are re-established.

In some implementations, the UE 115-a may use a beam failure timer configured by the one or more components of the BS 105-a. For example, the one or more components of the BS 105-a may configure the UE 115-a with a timer value for a BFD timer and a timer value for a BFR timer via RRC signaling, and the UE 115-a may perform BFD procedures and BFR procedures according to the configured timer values. However, in some implementations, channel conditions may change relatively frequently, and the configured timer values may not be optimized for current channel conditions. The UE 115-a may measure and estimate the channel conditions, and thus, in order to update the configured timer values, the UE 115-a may report the channel conditions to the one or more components of the BS 105-a, and the one or more components of the BS 105-a may update the timer values via RRC signaling, during which time the channel conditions may continue to change. Further, reporting the channel conditions and updating the timer values in this way may waste time and frequency resources and increase latency associated with performing beam failure procedures due to waiting to perform the beam failure procedures until the timer values are updated.

To improve beam failure timer determination, the UE 115-a and the one or more components of the BS 105-a may support the UE determination of beam failure timers. For example, the UE 115-a may be configured to autonomously determine a timer value for a beam failure timer (such as a BFD timer, a BFR timer, or both) rather than using a timer value configured by the one or more components of the BS 105-a. In some implementations, the UE 115-a may autonomously determine the timer value for the beam failure timer using an ML model as described with reference to FIGS. 4 and 5. In some other implementations, the UE 115-a may autonomously determine the timer value for the beam failure timer using a mapping (such as a lookup table) that maps parameters associated with the beam failure procedure 250 to timer values for beam failure timers as described with reference to FIGS. 4 and 5.

In some implementations, the one or more components of the BS 105-a may configure the UE 115-a with one or more configurations for autonomously determining the timer value for the beam failure timer. For example, the one or more components of the BS 105-a may transmit one or more control messages 215 to the UE 115-a that indicate one or more ML models, one or more mappings, or a combination thereof, for the UE 115-a to use in determining the timer value for the beam failure timer. In some implementations in which the one or more components of the BS 105-a configures the UE 115-a with multiple configuration (such as multiple ML models, multiple mappings, both an ML model and a mapping), the one or more components of the BS 105-a also may transmit a configuration indication 245 indicating which ML model or mapping that the UE 115-a is to use to autonomously determine the timer value for the beam failure timer. In some implementations, the one or more components of the BS 105-a may transmit the one or more control messages 215 in RRC signaling. In some implementations, the one or more components of the BS 105-a may transmit the configuration indication in downlink control information (DCI) or in a MAC-control element (MAC-CE), for example, to dynamically indicate or switch which configuration the UE 115-a uses to autonomously determine the timer value for the beam failure timer.

In some implementations, the UE 115-a may be configured with the one or more configurations for autonomously determining the timer value for the beam failure timer during a factory setup (such as during manufacturing or as part of an initial configuration) of the UE 115-a. For example, during factory setup of the UE 115-a (such as during a manufacturing process of the UE 115-a), the UE 115-a may be configured with one or more ML models, one or more mappings, or a combination thereof, for the UE 115-a to use in determining the timer value for the beam failure timer. In some implementations in which the UE 115-a is configured with multiple configurations during the factory setup, the one or more components of the BS 105-a may transmit the configuration indication 245 to indicate which configuration the UE 115-a is to use to autonomously determine the timer value for the beam failure timer. For example, the UE 115-a may indicate to the one or more components of the BS 105-a with which configurations the UE 115-a was configured during the factory setup and the one or more components of the BS 105-a may indicate the configuration the UE 115-a is to use.

The UE 115-a may autonomously determine the timer value for the beam failure timer based on one or more capabilities of the UE 115-a, as further described with reference to FIG. 5. For example, the UE 115-a may transmit a capability message 225 to the one or more components of the BS 105-a that indicates one or more capabilities associated with determining the timer value for the beam failure timer. In some implementations, the one or more capabilities may include whether the UE 115-a is capable of autonomously determining the timer value for the beam failure timer, whether the UE 115-a is capable of using ML models to determine the timer value for the beam failure timer, a processing power of the UE 115-a, a processing capacity of the UE 115-*a*, a memory storage of the UE 115-*a*, computation resources available to the UE 115-*a* for using ML models to determine the timer value for the beam failure timer, or a combination thereof. In some implementations, the one or more components of the BS 105-*a* may configure the UE 115-*a* with one or more ML models, one or more mappings, or a combination thereof, for autonomously determining the timer value for the beam failure timer based on the capabilities indicated by the capability message 225. For example, the one or more components of the BS 105-*a* may refrain from configuring the UE 115-*a* with ML models if ML models are unsupported by the UE 115-*a* for the autonomous timer value determination and instead may configure the UE 115-*a* with one or more mappings. Additionally, or alternatively, the relatively higher levels or quantities of processing power, processing capacity, memory storage, or computation resources of the UE 115-*a* may indicate that the UE 115-*a* may support relatively more complex or precise ML models and mappings, and the one or more components of the BS 105-*a* may configure the UE 115-*a* with the relatively more complex or precise ML models and mappings accordingly.

In some implementations, the UE 115-*a* may transmit the capability message 225 in response to a request from the one or more components of the BS 105-*a*. For example, the one or more components of the BS 105-*a* may transmit a capability request 230 to the UE 115-*a* that requests for the UE 115-*a* to report the one or more capabilities, and the UE 115-*a* may transmit the capability message 225 in response to receiving the capability request 230. In some other implementations, the UE 115-*a* may be configured to transmit the capability message 225 without prompt from the UE 115-*a*. In some implementations, the UE 115-*a* may transmit the capability message 225 in a MAC-CE or in uplink control information (UCI). In some implementations, the one or more components of the BS 105-*a* may transmit the capability request 230 in a MAC-CE or in DCI.

The one or more components of BS 105-*a* may activate or deactivate the autonomous determination of the timer value for the beam failure timer by the UE 115-*a*. For example, the one or more components of the BS 105-*a* may transmit an activation message 235 to the UE 115-*a* that activates the autonomous determination of the timer value for the beam failure timer by the UE 115-*a*. Alternatively, the activation message 235 may deactivate the autonomous determination of the timer value for the beam failure timer by the UE 115-*a*. In some implementations, the one or more components of the BS 105-*a* may activate or deactivate the autonomous determination of timer values for various combinations of beam failure procedures. For example, the one or more components of the BS 105-*a* may activate the UE 115-*a* (for example, via the activation message 235) to autonomously determine timer values for BFD timers and BFR timers. Additionally, or alternatively, the one or more components of the BS 105-*a* may activate the UE 115-*a* to autonomously determine timer values for BFD timers and deactivate the UE 115-*a* from autonomously determining timer values for BFR timers, or vice versa. Additionally, or alternatively, the one or more components of the BS 105-*a* may deactivate the UE 115-*a* from autonomously determining timer values for BFD timers and BFR timers. If the one or more components of the BS 105-*a* deactivates the UE 115-*a* from autonomously determining a timer value for a beam failure timer of a given beam failure procedure, the UE 115-*a* may perform the given beam failure procedure in accordance with a timer value for the beam failure timer configured by the one or more components of the BS 105-*a*.

The one or more components of BS 105-*a* may transmit multiple activation messages 235 over time in order to change for which beam failure procedures the UE 115-*a* is configured (for example, activated) to autonomously determine corresponding beam failure timer values.

In some implementations, the one or more components of the BS 105-*a* may transmit the activation message 235 in response to a request from the UE 115-*a*. For example, the UE 115-*a* may transmit an activation request 240 to the one or more components of the BS 105-*a* that requests for the one or more components of the BS 105-*a* to activate or deactivate the autonomous determination by the UE 115-*a* of timer values for beam failure timers of one or more beam failure procedures. For instance, the activation request 240 may request for the one or more components of the BS 105-*a* to activate or deactivate the autonomous determination by the UE 115-*a* of timer values for a BFD timer, a BFR timer, or a combination thereof. In some implementations, the one or more components of the BS 105-*a* may transmit the activation message 235 in a MAC-CE or in DCI. In some implementations, the UE 115-*a* may transmit the activation request 240 in a MAC-CE or in UCI.

In some implementations, the one or more components of the BS 105-*a* may activate or deactivate beam failure timer value determination by the UE 115-*a* based on the one or more capabilities indicated by the capability message 225. For example, the one or more components of the BS 105-*a* may activate the beam failure timer value determination by the UE 115-*a* if the one or more capabilities indicate that the UE 115-*a* is capable of the beam failure timer value determination. Additionally, or alternatively, the one or more capabilities may indicate a timing for which the UE 115-*a* may autonomously determine a timer value for a beam failure timer, and the one or more components of the BS 105-*a* may activate or deactivate the beam failure timer value determination in accordance with latency constraints associated with the beam failure procedure 250.

Figure 3A:
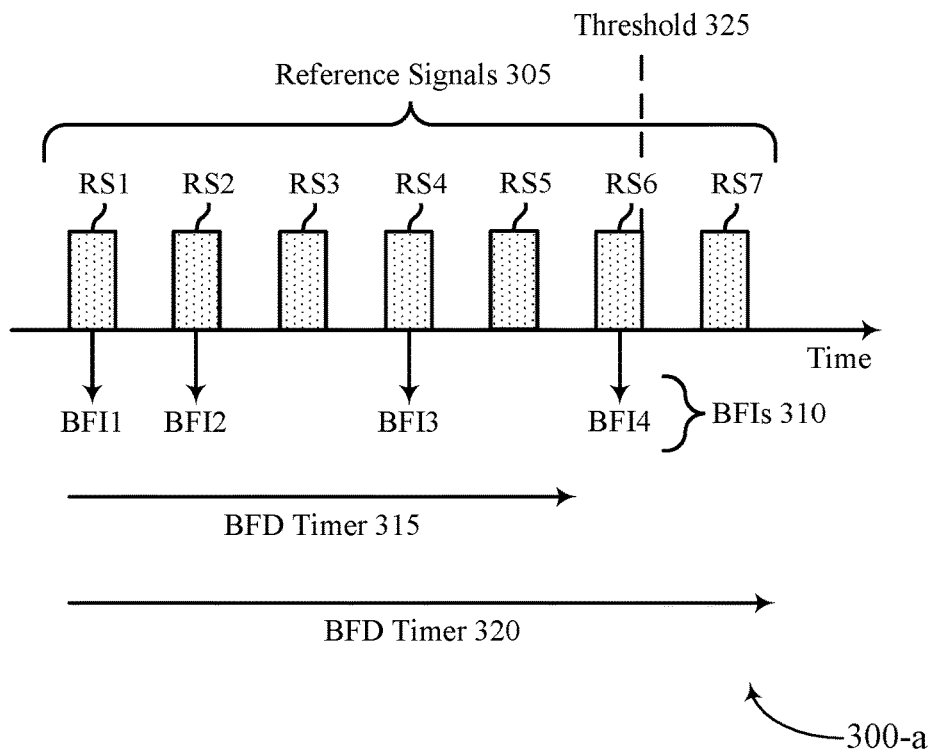
FIGS. 3A and 3B illustrate examples of communication sequences that support techniques for beam failure detection and recovery.

FIG. 3A illustrates an example of a communication sequence 300-*a* that supports techniques for beam failure detection and recovery. The communication sequence 300-*a* may implement or be implemented by aspects of the wireless communications system 100 or the signaling diagram 200 described with reference to FIGS. 1 and 2. For example, the communication sequence 300-*a* may be implemented by a UE 115 and a BS 105 to support performing BFD procedures in accordance with UE determined BFD timers.

The communication sequence 300-*a* depicts reference signals 305 that may be transmitted by one or more components of the BS 105 to the UE 115 as part of a BFD procedure. For example, the reference signals 305 may include reference signals RS1, RS2, RS3, RS4, RS5, RS6, and RS7, which may be examples of BFD-RSs (such as CSI-RSs or SSBs). The one or more components of BS 105 may periodically transmit each reference signal 305 in a respectively configured time period.

As part of the BFD procedure, the UE 115 may generate BFIs 310 in response to receiving the reference signals 305. For example, for each reference signal 305, the UE 115 may determine whether to generate a BFI 310 corresponding to the reference signal 305 (such as in response to determining that an estimated BLER of the reference signal 305 meets or exceeds a threshold BLER). For example, as described with reference to FIGS. 1 and 2, the UE 115 may measure an SINR of the reference signal 305 and estimate a BLER of the reference signal using the SINR measurement. If the estimated BLER of the reference signal meets or exceeds a threshold BLER, a physical (PHY) layer at the UE 115 may generate and report the BFI 310 to a MAC layer at the UE 115, which may track (such as count) a quantity of reported BFIs 310. In the example of FIG. 3A, the UE 115 may generate a BFI1 corresponding to the RS1, a BFI2 corresponding to the RS2, a BFI3 corresponding to the RS4, and a BFI4 corresponding to the RS6.

The UE 115 may perform the BFD procedure in accordance with a BFD timer having a timer value (such as a duration) autonomously determined by the UE 115, for example, as described with reference to FIGS. 4 and 5. For example, the UE 115 may autonomously select, calculate, ascertain or determine a timer value for a BFD timer 315 and may initiate the BFD timer 315 in response to receiving the RS1. The UE 115 may determine whether beam failure occurs based on the quantity of BFIs 310 generated within a duration of the BFD timer 315. For example, the UE 115 may be configured with a threshold 325 corresponding to a threshold quantity of BFIs 310 that indicates an occurrence of beam failure. If the UE 115 generates at least the threshold quantity of BFIs 310 (such as four BFIs 310, or some other quantity of BFIs 310) before an expiration of the BFD timer 315, the UE 115 may ascertain or determine that beam failure has occurred, as described with reference to FIGS. 1 and 2. Otherwise, the UE 115 may ascertain or determine that beam failure has not occurred, as described with reference to FIGS. 1 and 2. Accordingly, in the example of FIG. 3A, the UE 115 may ascertain or determine that beam failure has not occurred due to generating three BFIs 310 (for example, BFI1 through BFI3) before the expiration of the BFD timer 315 if performing the BFD procedure in accordance with the BFD timer 315. Here, the UE 115 may end the BFD procedure upon expiration of the BFD timer 315 and may not generate the BFI4 corresponding to the RS6, for example, due to the one or more components of the BS 105 transmitting the RS6 after the expiration of the BFD timer 315.

Additionally, or alternatively, the UE 115 may autonomously determine a timer value for a BFD timer 320, which may be greater than the timer value for the BFD timer 315, and may perform the BFD procedure in accordance with the BFD timer 320. For example, the UE 115 may initiate the BFD timer 320 in response to receiving the RS1. Here, the UE 115 may generate four BFIs 310 (for example, BFI1 through BFI4) before an expiration of the BFD timer 320. Accordingly, upon generating the threshold quantity of BFIs 310, the UE 115 may ascertain or determine that beam failure has occurred and may end the BFD procedure (for example, before the expiration of the BFD timer 320).

In some implementations, the UE 115 may autonomously determine the timer values for both of the BFD timer 315 and the BFD timer 320. For example, the BFD timer 315 may be used in counting a first type of BFI 310 during the BFD procedure, and the BFD timer 320 may be used in counting a second type of BFI 310 during the BFD procedure. For example, the first type of BFI 310 may correspond to BFIs 310 that are generated due to noise experienced at the UE 115, and the second type of BFI 310 may correspond to BFIs 310 that are generated due to interference experienced at the UE 115. In some implementations, the UE 115 may conduct separate counting processes for each type of BFI 310 generated. For example, the UE 115 may initiate both of the BFD timer 315 and the BFD timer 320 in response to receiving the RS1 and may count BFIs 310 separately depending on the type of BFI 310 generated. In some implementations, the UE 115 may be configured with a threshold 325 for each counting process.

Figure 3B:
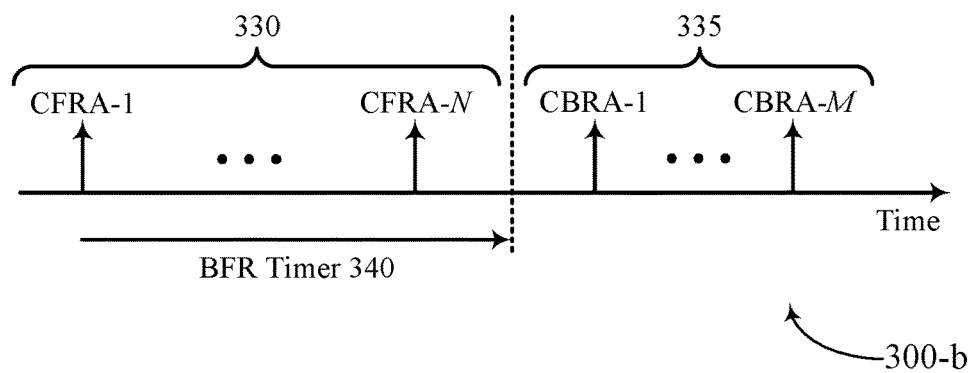

FIG. 3B illustrates an example of a communication sequence 300-b that supports techniques for beam failure detection and recovery. The communication sequence 300-b may implement or be implemented by aspects of the wireless communications system 100 or the signaling diagram 200 described with reference to FIGS. 1 and 2. For example, the communication sequence 300-b may be implemented by a UE 115 and a BS 105 to support performing BFR procedures in accordance with UE determined BFD timers.

The communication sequence 300-b depicts a BFR procedure performed by the UE 115 in response to determining that beam failure has occurred (for example, based on a BFD procedure as described with reference to FIGS. 1, 2 and 3A). The UE 115 may perform the BFR procedure in accordance with a BFR timer 340 having a timer value autonomously determined by the UE 115, for example, as described with reference to FIGS. 4 and 5. For example, the UE 115 may initiate the BFR timer 340 in response to determining that the beam failure has occurred and may perform a set of CFRA procedures 330 while the BFR timer 340 runs. For instance, the UE 115 may perform a CFRA-1 procedure through a CFRA-N procedure before an expiration of the BFR timer 340. If the UE 115 successfully performs the BFR procedure via one of the CFRA procedures 330, the UE 115 may end the BFR procedure. However, if the UE 115 fails to re-establish a connection with one or more components of the BS 105 before an expiration of the BFR timer 340, the UE 115 may switch to performing a set of CBRA procedures 335 upon expiration of the BFR timer 340. For example, after the BFR timer 340 expires, the UE 115 may perform one or more of a CBRA-1 procedure through a CBRA-M procedure, for example, until the UE 115 successfully re-establishes the connection with the one or more components of the BS 105.

In some implementations, the UE 115 may select, calculate, ascertain or determine the timer value for the BFR timer 340 based on a quantity of available preambles for performing the CFRA procedures 330. For example, the UE 115 may select, calculate, ascertain, or determine the timer value for the BFR timer 340 such that the UE 115 may have sufficient time to perform a CFRA procedure 330 corresponding to each available preamble. For instance, if N preambles respectively corresponding to the CFRA-1 procedure through the CFRA-N procedure are available, the UE 115 may select, calculate, ascertain or determine the BFR timer 340 such that the UE 115 may have sufficient time to perform each of the CFRA-1 procedure through the CFRA-N procedure before the BFR timer expires. In some implementations, performing CFRA procedures 330 may be associated with a lower latency than performing CBRA procedures 335. Accordingly, selecting, calculating, ascertaining or determining the timer value of the BFR timer 340 such that the UE 115 may have sufficient time to perform at least each of the CFRA-a procedure through the CFRA-N procedure may increase a likelihood that the BFR procedure is successfully completed via a CFRA procedure 330, thereby reducing a latency associated with performing the BFR procedure.

Figure 4:
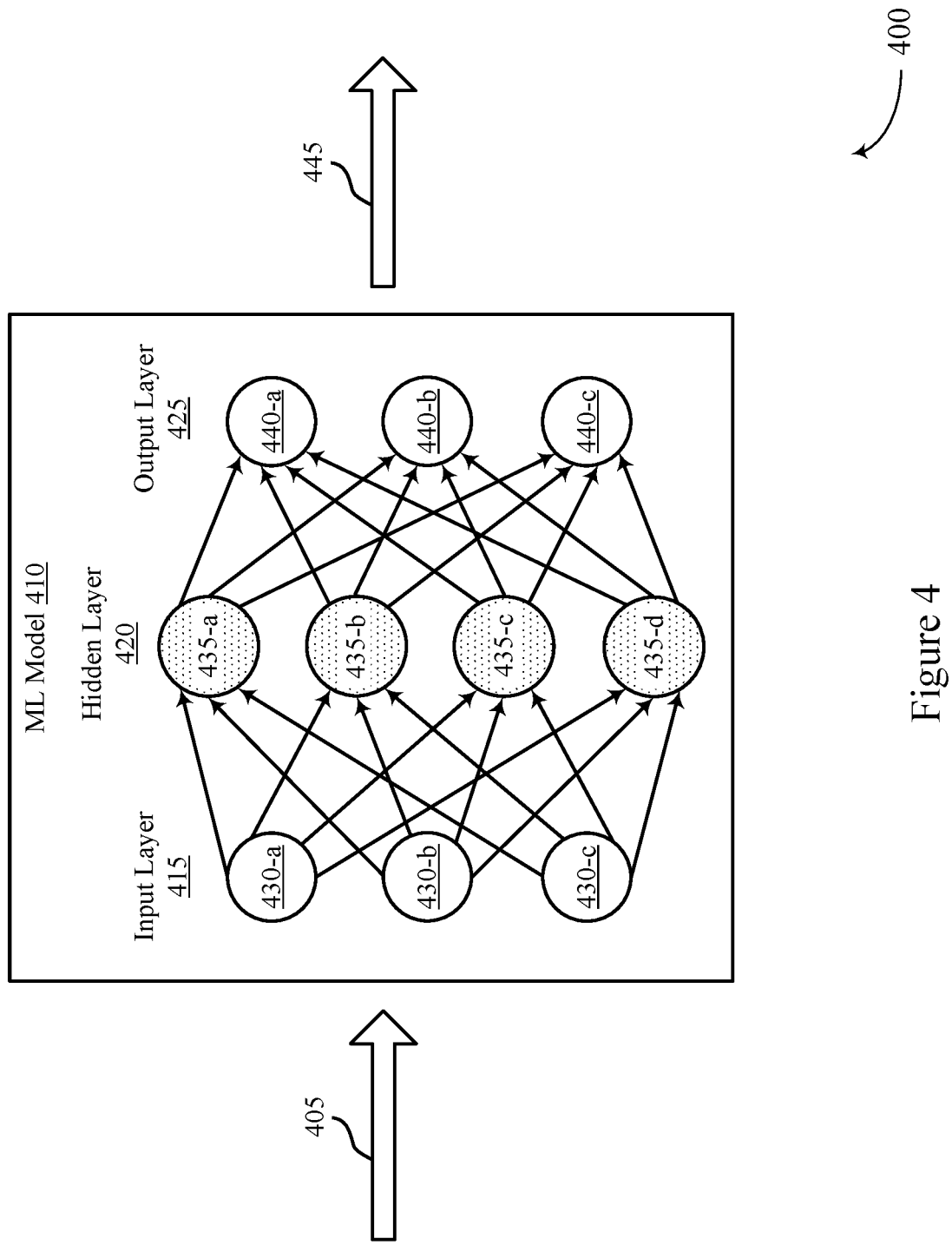
FIG. 4 illustrates an example of a machine learning (ML) process that supports techniques for beam failure detection and recovery.

FIG. 4 illustrates an example of an ML process 400 that supports techniques for beam failure detection and recovery. The ML process 400 may be implemented at a wireless device, such as a UE 115 as described herein, including with reference to FIGS. 1-3B. The ML process 400 may include a ML model 410. In some implementations, the wireless device may receive a neural network model from a BS 105 (such as a BS 105 as described herein, including with reference to FIGS. 1-3B) and implement one or more ML models 410 as part of the neural network model to optimize communication processes.

As illustrated, the ML model 410 may be an example of a neural network, such as a feed forward (FF) or deep feed forward (DFF) neural network, a recurrent neural network (RNN), a long/short term memory (LSTM) neural network, a convolutional neural network (CNN), or any other type of neural network. However, any other ML models may be supported by the UE 115. For example, the ML model 410 may implement a nearest neighbor algorithm, a linear regression algorithm, a Naïve Bayes algorithm, a random forest algorithm, or any other ML model. Further, the ML process 400 may involve supervised learning, unsupervised learning, semi-supervised learning, reinforcement learning, or any combination thereof. The ML may be performed prior to deployment of a UE 115, while the UE 115 is deployed, during low usage periods of the UE 115 while the UE 115 is deployed, or any combination thereof.

The ML model 410 may include an input layer 415, one or more hidden layers 420, and an output layer 425. In a fully connected neural network with one hidden layer 420, each hidden layer node 435 may receive a value from each input layer node 430 as input, where each input is weighted. These neural network weights may be based on a cost function that is revised during training of the ML model 410. Similarly, each output layer node 440 may receive a value from each hidden layer node 435 as input, where the inputs are weighted. If post-deployment training (such as online training) is supported at a UE 115, the UE 115 may allocate memory to store errors or gradients for reverse matrix multiplication. These errors or gradients may support updating the ML model 410 based on output feedback. Training the ML model 410 may support computation of the weights (such as connecting the input layer nodes 430 to the hidden layer nodes 435 and the hidden layer nodes 435 to the output layer nodes 440) to map an input pattern to a desired output outcome. This training may result in a UE-specific ML model 410 based on the historic application data and data transfer for a specific UE 115.

The UE 115 may send input values 405 to the ML model 410 for processing. In some example, the UE 115 may perform preprocessing according to a sequence of operations received from one or more components of the BS 105 on the input values 405 such that the input values 405 may be in a format that is compatible with the ML model 410. The input values 405 may be converted into a set of k input layer nodes 430 at the input layer 415. In some implementations, different measurements may be input at different input layer nodes 430 of the input layer 415. Some input layer nodes 430 may be assigned default values (such as values of 0) if the number of input layer nodes 430 exceeds the number of inputs corresponding to the input values 405. As illustrated, the input layer 415 may include three input layer nodes 430-a, 430-b, and 430-c. However, it is to be understood that the input layer 415 may include any number of input layer nodes 430 (such as 20 input layer nodes 430, or some other number of input layer nodes 430).

The ML model 410 may convert the input layer 415 to a hidden layer 420 based on a number of input-to-hidden weights between the k input layer nodes 430 and the n hidden layer nodes 435. The ML model 410 may include any number of hidden layers 420 as intermediate steps between the input layer 415 and the output layer 425. Additionally, each hidden layer 420 may include any number of nodes. For example, as illustrated, the hidden layer 420 may include four hidden layer nodes 435-a, 435-b, 435-c, and 435-d. However, it is to be understood that the hidden layer 420 may include any number of hidden layer nodes 435 (such as 10 hidden layer nodes 435, or some other number of hidden layer nodes 435). In a fully connected neural network, each node in a layer may be based on each node in the previous layer. For example, the value of hidden layer node 435-a may be based on the values of input layer nodes 430-a, 430-b, and 430-c (such as with different weights applied to each node value).

The ML model 410 may determine values for the output layer nodes 440 of the output layer 425 following one or more hidden layers 420. For example, the ML model 410 may convert the hidden layer 420 to the output layer 425 based on a number of hidden-to-output weights between the n hidden layer nodes 435 and the m output layer nodes 440. In some implementations, n=m. Each output layer node 440 may correspond to a different output value 445 of the ML model 410. As illustrated, the ML model 410 may include three output layer nodes 440-a, 440-b, and 440-c, supporting three different threshold values. However, it is to be understood that the output layer 425 may include any number of output layer nodes 440 (such as 10 output layer nodes 440, or some other number of output layer nodes 440).

In some implementations, a UE 115 may utilize a neural network model based on the ML model 410, which may be used to select, calculate, ascertain or determine beam failure timer values for beam failure procedures (such as timer values for BFD timers, or BFR timers, or both) as described with reference to FIG. 5.

Figure 5:
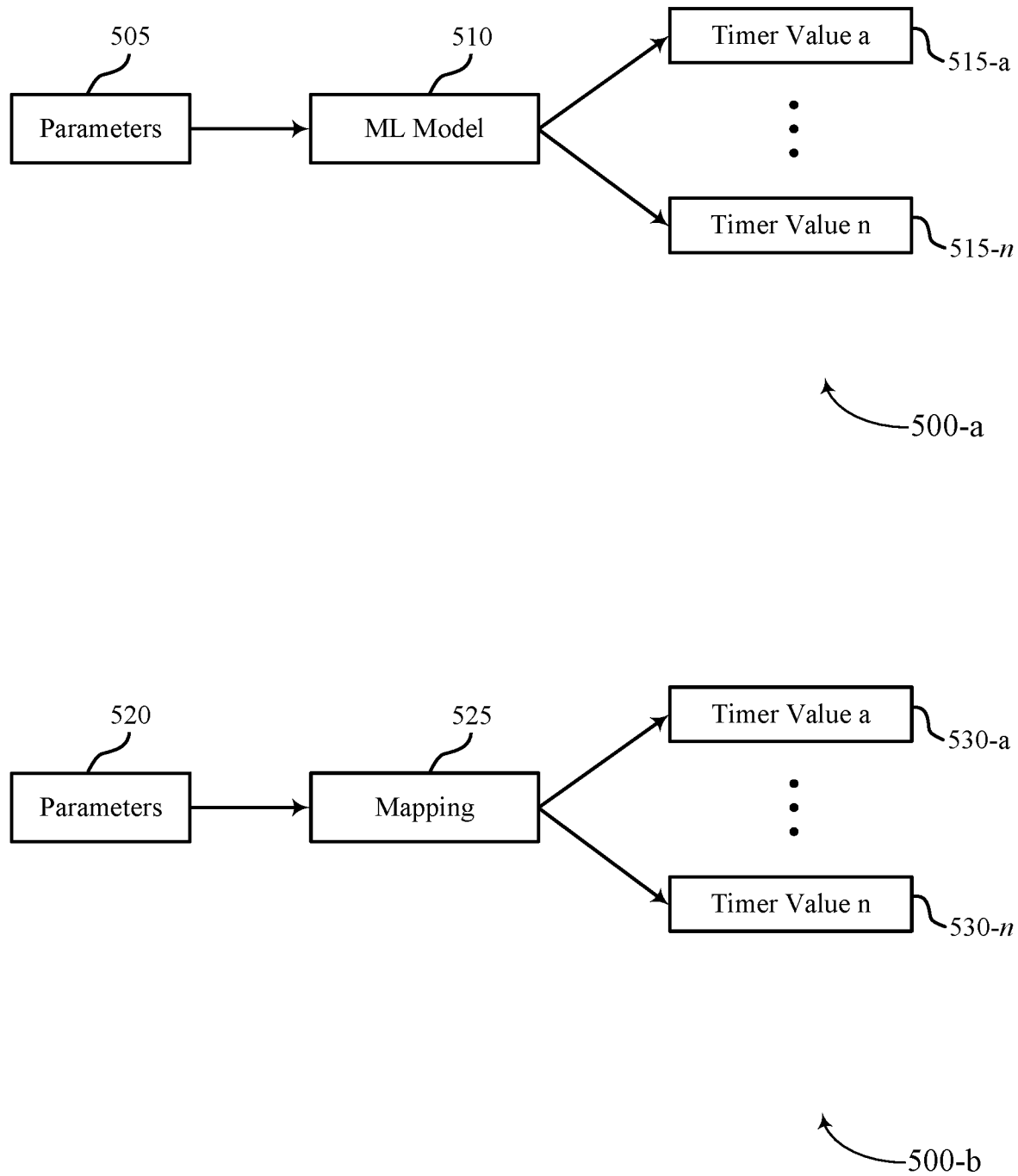
FIG. 5 illustrates examples of determination procedures that support techniques for beam failure detection and recovery.

FIG. 5 illustrates examples of determination procedures 500 that support techniques for beam failure detection and recovery. For example, FIG. 5 illustrates a determination procedure 500-a and a determination procedure 500-b that may implement or be implemented by aspects of the wireless communications system 100 or the signaling diagram 200 described with reference to FIGS. 1 and 2. For instance, the determination procedure 500-a and the determination procedure 500-b may be implemented by a UE 115 to support autonomous determination of timer values for beam failure timers by the UE 115.

The determination procedure 500-a depicts a procedure for autonomously determining a timer value 515 for a beam failure timer using an ML model 510. For example, to determine the timer value 515, the UE 115 may input a set of parameters 505 into the ML model 510 that outputs the timer value 515 (such as one of a timer value 515-a through 515-n) based on the set of parameters 505. For instance, the set of parameters 505 may be an example of input values sent to the ML model 510 by the UE 115 that are converted to input layer nodes at an input layer of the ML model 510. The ML model 510 may convert the input layer to one or more hidden layers of the ML model 510 and may convert the one or more hidden layers to an output layer corresponding to the timer value 515. The timer value 515 output by the ML model 510 may be the timer value 515 determined by the UE 115.

In some implementations, the set of parameters 505 may include channel measurements of a channel between the UE 115 and one or more components of a BS 105, a BFI reporting history associated with the UE 115, serving traffic quality of service (QoS) requirements, a quantity of available preambles for performing a CFRA procedure, or a combination thereof. The channel measurements may include a SINR ratio associated with communications between the UE 115 and the one or more components of the BS 105, a reference signal received power (RSRP) associated with the communications, an SNR associated with the communications, or a combination thereof. The BFI reporting history may correspond to a quantity of BFIs generated by the UE 115 within a past duration, such as an accumulated BFI count in a past t period. In some implementations, the set of parameters 505 may include the channel measurements, the BFI reporting history, and the serving traffic QoS requirements if the timer value 515 corresponds to a BFD timer. In some implementations, the set of parameters 505 may include the channel measurements, the BFI reporting history, and the quantity of available preambles if the timer value 515 corresponds to a BFR timer.

The timer value 515 output by the ML model 510 may be based on the channel measurements, the BFI reporting history, the serving traffic QoS requirements, the channel conditions, the quantity of available preambles, or a combination thereof. For example, the UE 115 measuring a lower SINR or SNR value or a higher RSRP value or generating a BFI reporting history indicating a relatively small quantity of recently generated BFIs may indicate that communications between the UE 115 and the one or more components of the BS 105 are relatively reliable and that the likelihood of beam failure occurring is lower compared to the UE 115 measuring a higher SINR or SNR value or a lower RSRP value or generating a BFI reporting history indicating a relatively large quantity of recently generated BFIs. Accordingly, if determining a timer value 515 for a BFD timer, the ML model 510 may output a timer value 515 having a lower value if the set of parameters 505 indicates that the communications are relatively reliable compared to if the set of parameters 505 indicates that the communications are relatively unreliable. In this way, the UE 115 may reduce a duration of a BFD procedure when communications are relatively reliable as beam failure is less likely to occur, thereby reducing a latency associated with performing the BFD procedure. In some implementations, the UE 115 may increase a reliability of a BFD procedure when communications are relatively unreliable by increasing a duration of the BFD procedure to enable the generation of additional BFIs within the BFD procedure. Additionally, or alternatively, the ML model 510 may output a timer value 515 having a higher value if the set of parameters 505 indicates a relatively high serving traffic QoS requirement so that the UE 115 may more accurately determine whether it is communicating using a failed beam and consequently satisfying the serving traffic QoS requirement.

Further, if determining a timer value 515 for a BFR timer, the ML model 510 may output a timer value 515 to enable the UE 115 to perform CFRA procedures corresponding to the quantity of available preambles. Accordingly, as the quantity of available preambles increases, the timer value 515 output by the ML model 510 also may increase. Additionally, the timer value 515 output by the ML model 510 further may increase as the channel measurements and BFI reporting history indicate more reliable communications, as such parameters may indicate that a CFRA procedure is more likely to succeed.

The determination procedure 500-*a* depicts a procedure for autonomously determining a timer value 530 for a beam failure timer using a mapping 525. For example, to determine the timer value 530, the UE 115 may map a set of parameters 520 to the timer value 530 (such as one of a timer value 530-*a* through 530-*n*) using the mapping 525. In some implementations, the mapping 525 may be an example of a lookup table that maps different combinations of parameters 520 to different timer values 530. In some implementations, the set of parameters 520 may be an example of the set of parameters 505. For example, the set of parameters 520 may include channel measurements of a channel between the UE 115 and one or more components of a BS 105, a BFI reporting history associated with the UE 115, a quantity of available preambles for performing a CFRA procedure, or a combination thereof. Additionally, the timer value 530 mapped by the mapping 525 may be based on the channel measurements, the BFI reporting history, the quantity of available preambles, or a combination thereof, similarly to the timer value 515 output by the ML model 510 described above.

Figure 6:
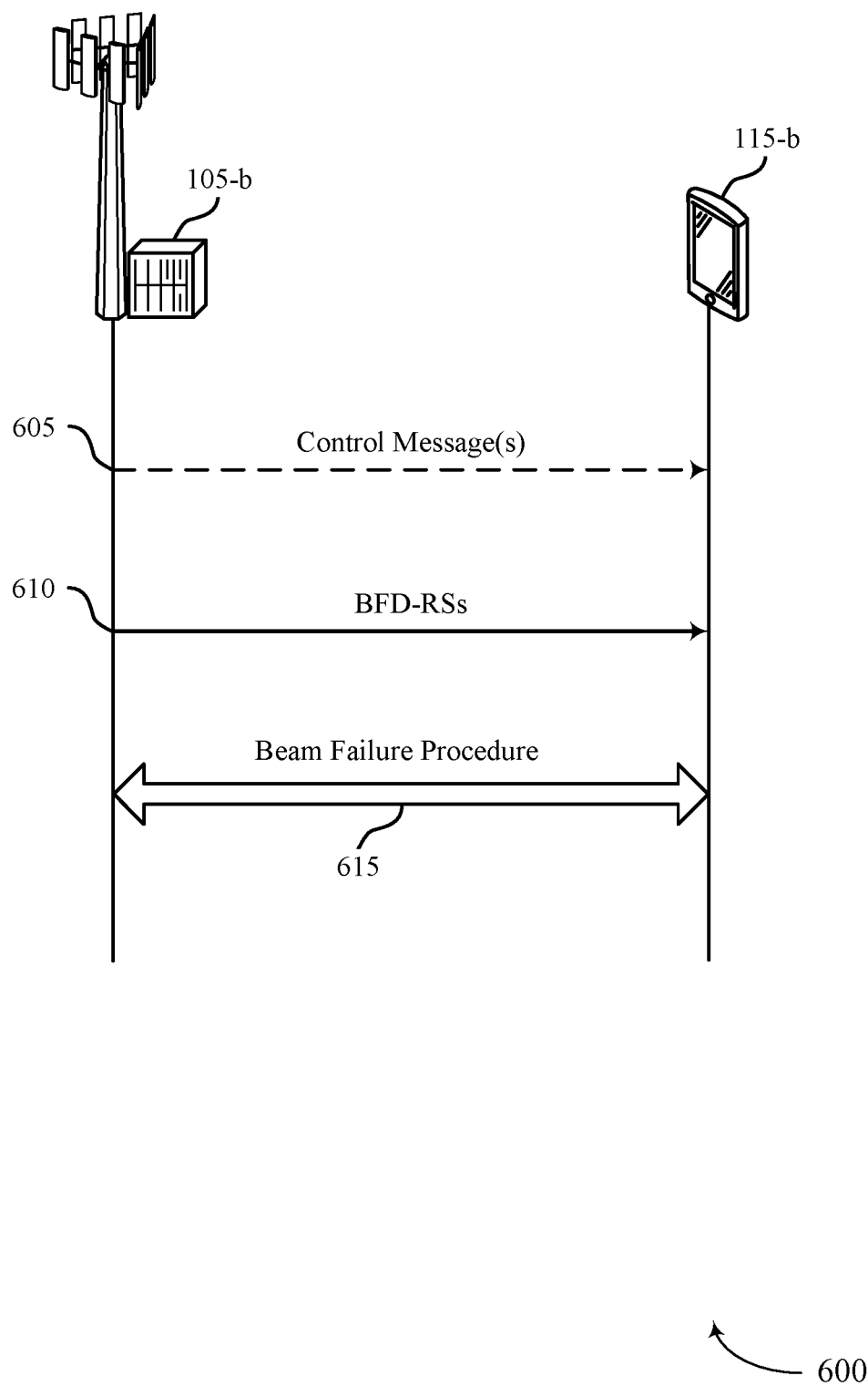
FIG. 6 illustrates an example of a process flow that supports techniques for beam failure detection and recovery.

FIG. 6 illustrates an example of a process flow 600 that supports techniques for beam failure detection and recovery. The process flow 600 may implement or may be implemented by aspects of the wireless communications system 100 and the signaling diagram 200 described with reference to FIGS. 1 and 2. For example, the process flow 600 may be implemented by one or more components of a BS 105-*b* and a UE 115-*b* and to support UE beam failure timer determination to increase beam failure procedure reliability and accuracy and reduce beam failure procedure latency, among other benefits.

The BS 105-*b* and the UE 115-*b* may each be respective examples of a BS 105 and a UE 115 described herein, including with reference to FIGS. 1-5. In the following description of the process flow 600, the operations may be performed in different orders or at different times. Some operations also may be omitted from the process flow 600, and other operations may be added to the process flow 600. Further, although some operations or signaling may be shown to occur at different times for discussion purposes, these operations may actually occur at the same time.

At 605, one or more components of the BS 105-*b* may transmit one or more control messages to the UE 115-*b* that indicate one or more configurations for determination, by the UE 115-*b*, of one or more timer values for one or more beam failure timers associated with a beam failure procedure. For example, the control messages may indicate one or more ML models, one or more mappings, or a combination thereof, that the UE 115-*b* may use to autonomously determine (such as autonomously select or calculate) a timer value for a beam failure timer, such as a timer value for a BFD timer or a BFR timer. In some implementations, the control messages may indicate different configurations for different beam failure procedures. For example, the control messages may indicate one or more first ML models, one or more first mappings, of a combination thereof, that the UE 115-*b* may use to autonomously determine a timer value for a BFD timer and may indicate one or more second ML models, one or more second mappings, of a combination thereof, that the UE 115-*b* may use to autonomously determine a timer value for a BFR timer.

In some implementations, the UE 115-*b* may be configured with the one or more configurations during a factory setup of the UE 115-*b*. Here, the one or more components of the BS 105-*b* may refrain from transmitting the one or more control messages.

At 610, the one or more components of the BS 105-*b* may transmit one or more BFD-RSs to the UE 115-*b* for measurement by the UE 115-*b* as part of a beam failure procedure. For example, the one or more components of the BS 105-*b* may transmit BFD-RSs using a beam and during periodically configured time periods that the UE 115-*b* may use to determine whether the beam has failed, for example, as part of a BFD procedure as described with reference to FIGS. 1, 2, and 3A.

At 615, the UE 115-*b* may perform the beam failure procedure in accordance with a beam failure timer autonomously determined by the UE 115-*b*. For example, as part of a BFD procedure, the UE 115-*b* may measure the BFD-RSs, generate BFIs corresponding to one or more of the BFD-RSs and before an expiration of the determined beam failure timer, and determine whether the beam has failed depending on the quantity of generated BFIs. Alternatively, as part of a BFR procedure initiated in response to determining that the beam has failed, the UE 115-*b* may perform one or more CFRA procedures before the expiration of the determined beam failure timer and may perform one or more CBRA procedures after the expiration of the determined beam failure timer if a connection between the UE 115-*b* and the one or more components of the BS 105-*b* failed to be re-established via the one or more CFRA procedures.

Figure 7:
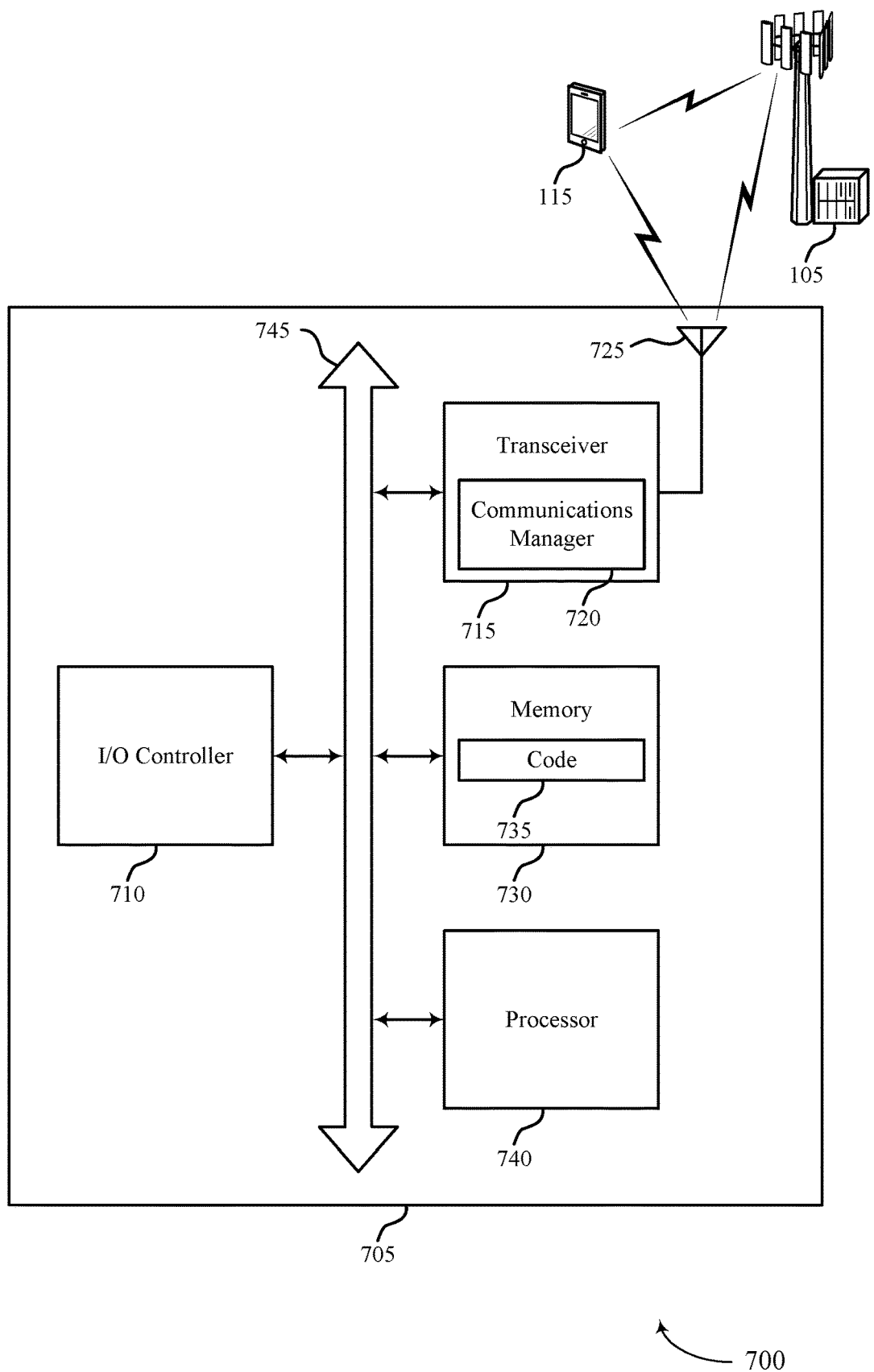
FIGS. 7 and 8 illustrate diagrams of systems including devices that support techniques for beam failure detection and recovery.

FIG. 7 illustrates a diagram of a system 700 including a device 705 that supports techniques for beam failure detection and recovery. The device 705 may communicate wirelessly with one or more BSs 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (for example, operatively, communicatively, functionally, electronically, electrically) via one or more buses (for example, a bus 745).

The I/O controller 710 may manage input and output signals for the device 705. The I/O controller 710 also may manage peripherals not integrated into the device 705. In some implementations, the I/O controller 710 may represent a physical connection or port to an external peripheral. In some implementations, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some implementations, the I/O controller 710 may be implemented as part of a processor or processing system, such as the processor 740. In some implementations, a user may interact with the device 705 via the I/O controller 710 or via hardware components controlled by the I/O controller 710.

In some implementations, the device 705 may include a single antenna 725. However, in some other implementations, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 also may include a modem to modulate the packets, to provide the modulated packets to one or more antennas 725 for transmission, and to demodulate packets received from the one or more antennas 725. In some implementations, the transceiver 715 may include one or more interfaces, such as one or more interfaces coupled with the one or more antennas 725 that are configured to support various receiving or obtaining operations, or one or more interfaces coupled with the one or more antennas 725 that are configured to support various transmitting or outputting operations, or a combination thereof. In some implementations, the transceiver 715 may include or be configured for coupling with one or more processors or memory components that are operable to perform or support operations based on received or obtained information or signals, or to generate information or other signals for transmission or other outputting, or any combination thereof. In some implementations, the transceiver 715, or the transceiver 715 and the one or more antennas 725, or the transceiver 715 and the one or more antennas 725 and one or more processors or memory components (for example, the processor 740, or the memory 730, or both), may be included in a chip or chip assembly that is installed in the device 705.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some implementations, the code 735 may not be directly executable by the processor 740 but may cause a computer (for example, when compiled and executed) to perform functions described herein. In some implementations, the memory 730 may contain, among other things, a basic I/O system (BIOS) which may control basic hardware or software operation such as the interaction with peripheral components or devices.

The processor 740 may be any one or more suitable processors capable of executing scripts or instructions of one or more software programs stored in the device 705 (such as within the memory 730). In some implementations, the processor 740 may be a component of a processing system. A processing system may generally refer to a system or series of machines or components that receives inputs and processes the inputs to produce a set of outputs (which may be passed to other systems or components of, for example, the device 705). For example, a processing system of the device 705 may refer to a system including the various other components or subcomponents of the device 705, such as the processor 740, or the transceiver 715, or the communications manager 720, or other components or combinations of components of the device 705. The processing system of the device 705 may interface with other components of the device 705, and may process information received from other components (such as inputs or signals) or output information to other components. For example, a chip or modem of the device 705 may include a processing system, a first interface to output information, and a second interface to obtain information. In some implementations, the first interface may refer to an interface between the processing system of the chip or modem and a transmitter, such that the device 705 may transmit information output from the chip or modem. In some implementations, the second interface may refer to an interface between the processing system of the chip or modem and a receiver, such that the device 705 may obtain information or signal inputs, and the information may be passed to the processing system. A person having ordinary skill in the art will readily recognize that the first interface also may obtain information or signal inputs, and the second interface also may output information or signal outputs.

The communications manager 720 may support wireless communication at a UE in accordance with examples as disclosed herein. For example, the communications manager 720 may be configured as or otherwise support a means for receiving, from a network entity, one or more reference signals in accordance with a configuration associated with a beam failure procedure. The communications manager 720 may be configured as or otherwise support a means for performing the beam failure procedure, the beam failure procedure including initiating a beam failure timer in response to one or more measurements of the one or more reference signals by the UE, where the beam failure timer is determined by the UE and the beam failure timer includes one of a BFD timer or a BFR timer.

In some implementations, the communications manager 720 may be configured as or otherwise support a means for determining, by the UE, a timer value for the beam failure timer using an ML model.

In some implementations, to support determining the timer value for the beam failure timer, the communications manager 720 may be configured as or otherwise support a means for inputting a set of parameters associated with the beam failure procedure into the ML model that outputs the timer value for the beam failure timer.

In some implementations, the set of parameters associated with the beam failure procedure includes an SINR associated with communications between the UE and the network entity, an RSRP associated with the communications, an SNR associated with the communications, a quantity of BFIs generated by the UE within a past duration, a quantity of available preambles for performing a CFRA procedure, or a combination thereof.

In some implementations, the communications manager 720 may be configured as or otherwise support a means for determining, by the UE, a timer value for the beam failure timer using a mapping that maps parameters associated with the beam failure procedure to timer values of beam failure timers.

In some implementations, the parameters associated with the beam failure procedure include an SINR associated with communications between the UE and the network entity, an RSRP associated with the communications, an SNR associated with the communications, a quantity of BFIs generated by the UE within a past duration, a quantity of available preambles for performing a CFRA procedure, or a combination thereof.

In some implementations, the communications manager 720 may be configured as or otherwise support a means for transmitting, to the network entity, a capability message indicating one or more capabilities of the UE associated with determining a timer value for the beam failure timer, where the timer value for the beam failure timer is determined by the UE based on the one or more capabilities of the UE.

In some implementations, the communications manager 720 may be configured as or otherwise support a means for receiving, from the network entity, a request to report the one or more capabilities of the UE, where transmitting the capability message is in response to receiving the request.

In some implementations, the one or more capabilities of the UE include a capability of the UE to determine the timer value for the beam failure timer, a capability associated with using ML models to determine the timer value for the beam failure timer, a processing power of the UE, a processing capacity of the UE, a memory storage of the UE, computation resources available to the UE for using the ML models, or a combination thereof.

In some implementations, the communications manager 720 may be configured as or otherwise support a means for receiving, from the network entity, a message that activates determination by the UE of timer values for beam failure timers for one or more beam failure procedures, the one or more beam failure procedures including the beam failure procedure, where a timer value for the beam failure timer is determined by the UE in response to receiving the message.

In some implementations, the communications manager 720 may be configured as or otherwise support a means for transmitting, to the network entity, a request to activate the determination of the timer values for the beam failure timers for the one or more beam failure procedures, where receiving the message is in response to transmitting the request.

In some implementations, the communications manager 720 may be configured as or otherwise support a means for receiving, from the network entity, a second message that deactivates determination by the UE of timer values for beam failure timers for one or more second beam failure procedures. In some implementations, the communications manager 720 may be configured as or otherwise support a means for performing a second beam failure procedure of the one or more second beam failure procedures in accordance with a second beam failure timer, where a second timer value for the second beam failure timer is configured by the network entity.

In some implementations, the communications manager 720 may be configured as or otherwise support a means for transmitting, to the network entity, a request to deactivate the determination of the timer values for the beam failure timers for the one or more second beam failure procedures, where receiving the second message is in response to transmitting the request.

In some implementations, the communications manager 720 may be configured as or otherwise support a means for receiving, from the network entity, one or more control messages indicating one or more ML models for beam failure timer value determination, one or more mappings that map parameters associated with the beam failure procedure to timer values of beam failure timers, or a combination thereof, the beam failure timer determined using an ML model of the one or more ML models or a mapping of the one or more mappings.

In some implementations, the communications manager 720 may be configured as or otherwise support a means for receiving, from the network entity, an indication for the UE to use the ML model or the mapping.

In some implementations, one or more ML models for beam failure timer value determination, one or more mappings that map parameters associated with the beam failure procedure to timer values of beam failure timers, or a combination thereof, are configured at the UE during a factory setup of the UE, the beam failure timer determined using an ML model of the one or more ML models or a mapping of the one or more mappings.

In some implementations, the beam failure procedure includes a BFD procedure, and the communications manager 720 may be configured as or otherwise support a means for determining, by the UE, a first timer value for a first BFD timer used in counting a first type of BFI during the BFD procedure. In some implementations, the communications manager 720 may be configured as or otherwise support a means for determining, by the UE, a second timer value for a second BFD timer used in counting a second type of BFI during the BFD procedure, where the beam failure timer corresponds to the first BFD timer or the second BFD timer based on a type of BFI counted during the BFD procedure.

In some implementations, to support performing the beam failure procedure, the communications manager 720 may be configured as or otherwise support a means for generating a set of BFIs in response to receiving the one or more reference signals, where generating a threshold quantity of BFIs prior to an expiration of the beam failure timer indicates beam failure.

In some implementations, to support performing the beam failure procedure, the communications manager 720 may be configured as or otherwise support a means for performing one or more CFRA procedures prior to an expiration of the beam failure timer.

In some implementations, to support performing the beam failure procedure, the communications manager 720 may be configured as or otherwise support a means for performing one or more CBRA procedures prior after the expiration of the beam failure timer based on failing to re-establish a connection with the network entity via the one or more CFRA procedures.

In some implementations, the communications manager 720 may be configured to perform various operations (for example, receiving, monitoring, transmitting) using or otherwise in cooperation with the transceiver 715, the one or more antennas 725, or any combination thereof. Although the communications manager 720 is illustrated as a separate component, in some implementations, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for beam failure detection and recovery as described herein, or the processor 740 and the memory 730 may be otherwise configured to perform or support such operations.

Figure 8:
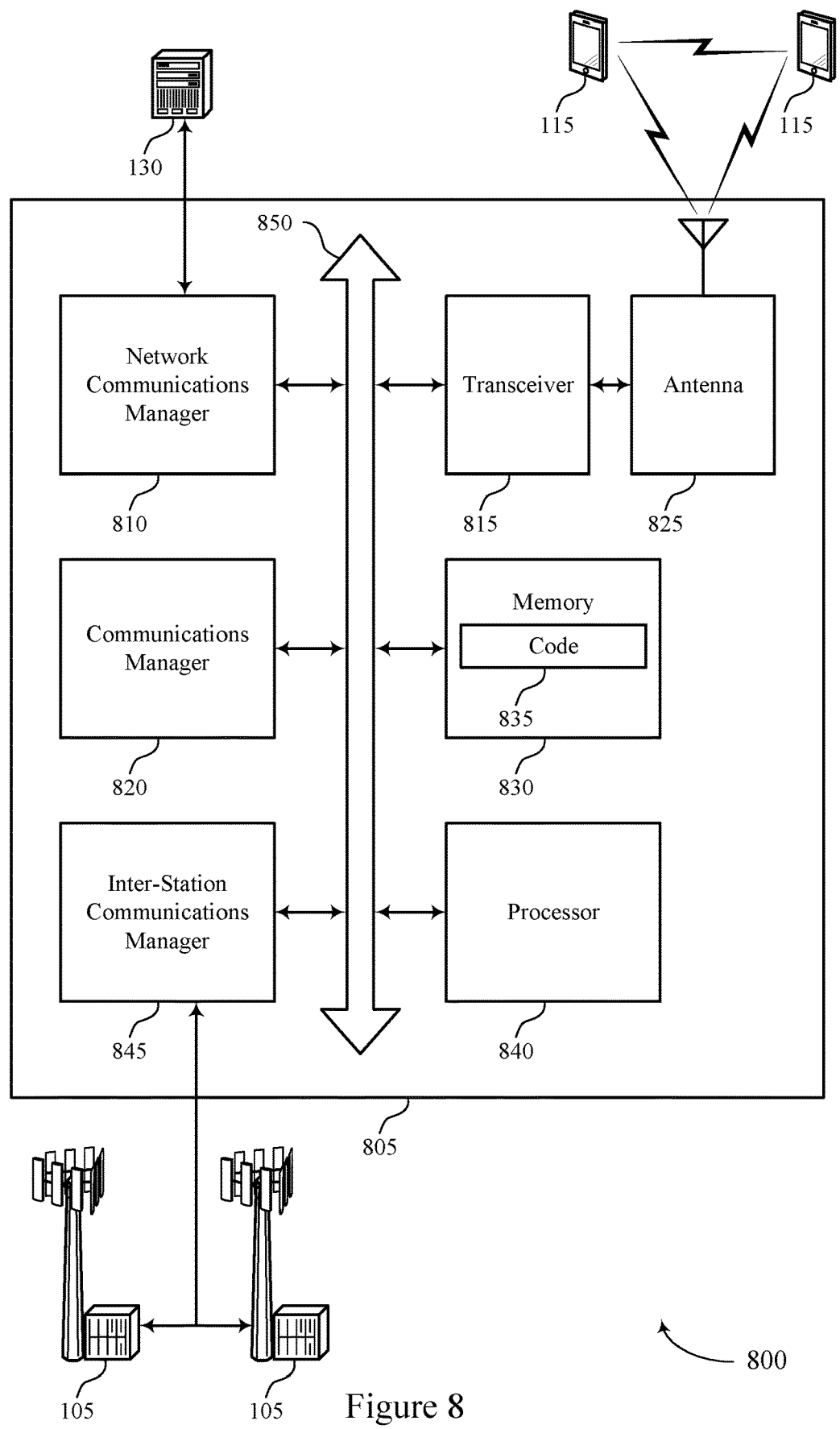

FIG. 8 illustrates a diagram of a system 800 including a device 805 that supports techniques for beam failure detection and recovery. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (for example, operatively, communicatively, functionally, electronically, electrically) via one or more buses (for example, a bus 850).

The network communications manager 810 may manage communications with a core network 130 (for example, via one or more wired backhaul links). For example, the network communications manager 810 may manage the transfer of data communications for client devices, such as one or more UEs 115.

In some implementations, the device 805 may include a single antenna 825. However, in some other implementations the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 also may include a modem to modulate the packets, to provide the modulated packets to one or more antennas 825 for transmission, and to demodulate packets received from the one or more antennas 825.

The memory 830 may include RAM and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some implementations, the code 835 may not be directly executable by the processor 840 but may cause a computer (for example, when compiled and executed) to perform functions described herein. In some implementations, the memory 830 may contain, among other things, a BIOS which may control basic hardware or software operation such as the interaction with peripheral components or devices.

The processor 840 may include an intelligent hardware device (such as a general-purpose processor, a DSP, a CPU, a microcontroller, an ASIC, an FPGA, a programmable logic device, a discrete gate or transistor logic component, a discrete hardware component, or any combination thereof). In some implementations, the processor 840 may be configured to operate a memory array using a memory controller. In some other implementations, a memory controller may be integrated into the processor 840. The processor 840 may be configured to execute computer-readable instructions stored in a memory (for example, the memory 830) to cause the device 805 to perform various functions (for example, functions or tasks supporting techniques for beam failure detection and recovery). For example, the device 805 or a component of the device 805 may include a processor 840 and memory 830 coupled to the processor 840, the processor 840 and memory 830 configured to perform various functions described herein.

The inter-station communications manager 845 may manage communications with other BSs 105, and may include a controller or scheduler for controlling communications with UEs 115 in cooperation with other BSs 105. For example, the inter-station communications manager 845 may coordinate scheduling for transmissions to UEs 115 for various interference mitigation techniques such as beamforming or joint transmission. In some implementations, the inter-station communications manager 845 may provide an X2 interface within an LTE/LTE-A wireless communications network technology to provide communication between BSs 105.

The communications manager 820 may support wireless communication at a network entity in accordance with examples as disclosed herein. For example, the communications manager 820 may be configured as or otherwise support a means for transmitting, to a UE, an indication of one or more configurations for determination, by the UE, of one or more timer values for one or more beam failure timers associated with a beam failure procedure. The communications manager 820 may be configured as or otherwise support a means for transmitting, to the UE, one or more reference signals for measurement by the UE as part of the beam failure procedure.

In some implementations, the one or more configurations for the determination include one or more ML models for beam failure timer value determination.

In some implementations, the one or more configurations for the determination include one or more mappings that map parameters associated with the beam failure procedure to timer values of beam failure timers.

In some implementations, the communications manager 820 may be configured as or otherwise support a means for receiving, from the UE, a capability message indicating one or more capabilities of the UE associated with determining the one or more timer values for the one or more beam failure timers, where the one or more configurations for the determination are based on the one or more capabilities of the UE.

In some implementations, the communications manager 820 may be configured as or otherwise support a means for transmitting, to the UE, a request to report the one or more capabilities of the UE, where receiving the capability message is in response to transmitting the request.

In some implementations, the communications manager 820 may be configured as or otherwise support a means for transmitting, to the UE, a message that activates the determination, by the UE, of the one or more timer values for the one or more beam failure timers.

In some implementations, the communications manager 820 may be configured as or otherwise support a means for transmitting, to the UE, a message that deactivates the determination, by the UE, of the one or more timer values for the one or more beam failure timers.

In some implementations, the beam failure procedure includes a BFD procedure or a BFR procedure.

In some implementations, the communications manager 820 may be configured to perform various operations (for example, receiving, monitoring, transmitting) using or otherwise in cooperation with the transceiver 815, the one or more antennas 825, or any combination thereof. Although the communications manager 820 is illustrated as a separate component, in some implementations, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for beam failure detection and recovery as described herein, or the processor 840 and the memory 830 may be otherwise configured to perform or support such operations.

Figure 9:
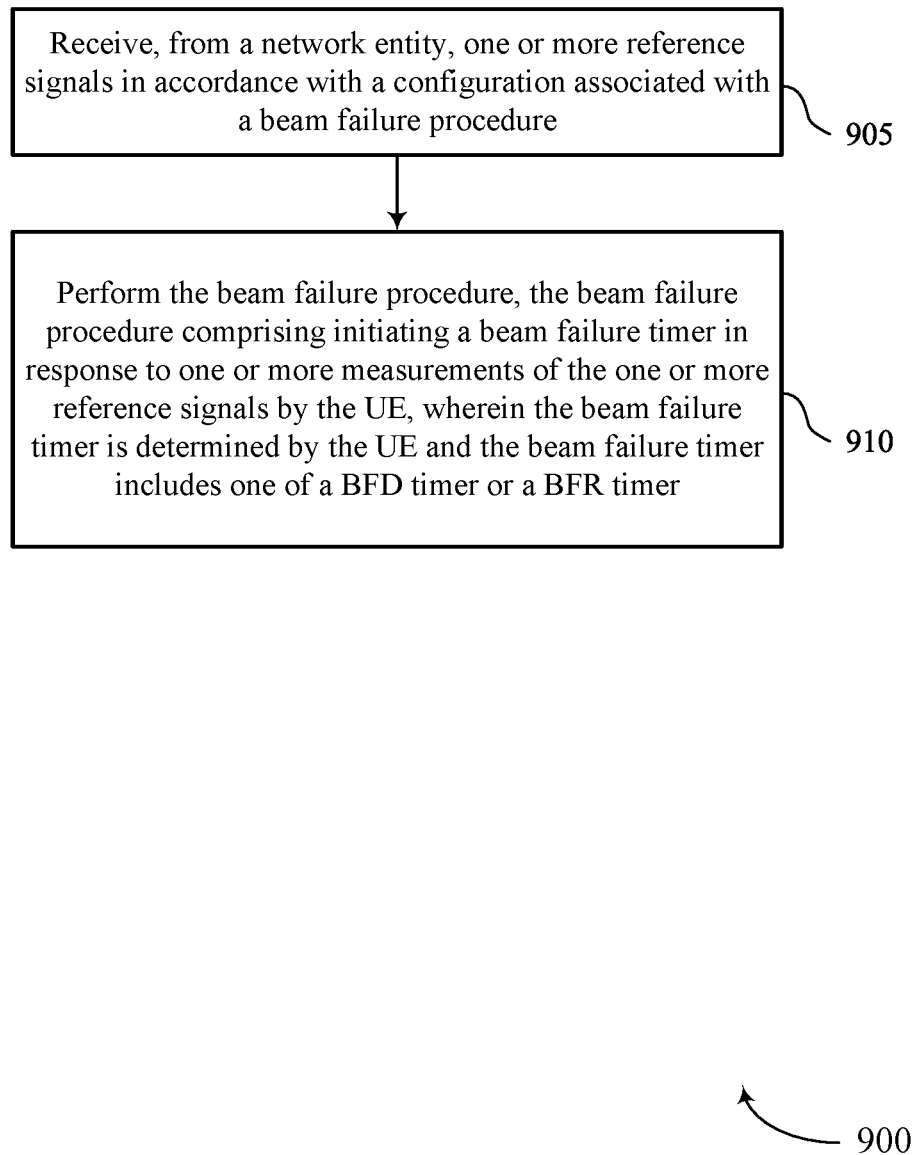
FIGS. 9-15 illustrate flowcharts illustrating methods that support techniques for beam failure detection and recovery.

FIG. 9 illustrates a flowchart illustrating a method 900 that supports techniques for beam failure detection and recovery. The operations of the method 900 may be implemented by a UE or its components as described herein. For example, the operations of the method 900 may be performed by a UE 115 as described with reference to FIGS. 1-7. In some implementations, a UE may execute a set of instructions to control the functional elements of the UE to perform the described functions. Additionally, or alternatively, the UE may perform aspects of the described functions using special-purpose hardware.

At 905, the method may include receiving, from a network entity, one or more reference signals in accordance with a configuration associated with a beam failure procedure. The operations of 905 may be performed in accordance with examples as disclosed herein.

At 910, the method may include performing the beam failure procedure, the beam failure procedure including initiating a beam failure timer in response to one or more measurements of the one or more reference signals by the UE, where the beam failure timer is determined by the UE and the beam failure timer includes one of a BFD timer or a BFR timer. The operations of 910 may be performed in accordance with examples as disclosed herein.

Figure 10:
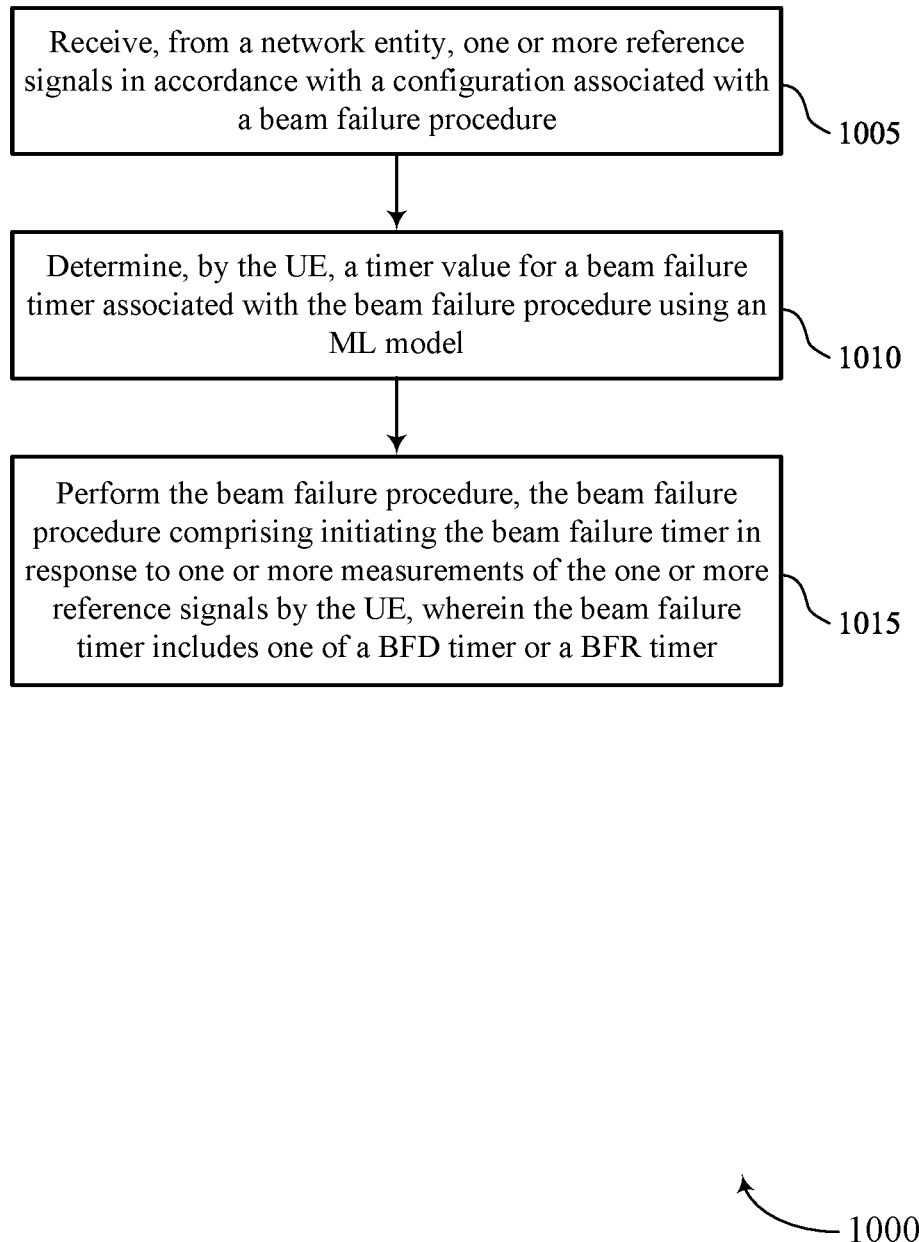

FIG. 10 illustrates a flowchart illustrating a method 1000 that supports techniques for beam failure detection and recovery. The operations of the method 1000 may be implemented by a UE or its components as described herein. For example, the operations of the method 1000 may be performed by a UE 115 as described with reference to FIGS. 1-7. In some implementations, a UE may execute a set of instructions to control the functional elements of the UE to perform the described functions. Additionally, or alternatively, the UE may perform aspects of the described functions using special-purpose hardware.

At 1005, the method may include receiving, from a network entity, one or more reference signals in accordance with a configuration associated with a beam failure procedure. The operations of 1005 may be performed in accordance with examples as disclosed herein.

At 1010, the method may include determining, by the UE, a timer value for a beam failure timer associated with the beam failure procedure using an ML model. The operations of 1010 may be performed in accordance with examples as disclosed herein.

At 1015, the method may include performing the beam failure procedure, the beam failure procedure including initiating the beam failure timer in response to one or more measurements of the one or more reference signals by the UE, where the beam failure timer is determined by the UE and the beam failure timer includes one of a BFD timer or a BFR timer. The operations of 1015 may be performed in accordance with examples as disclosed herein.

Figure 11:
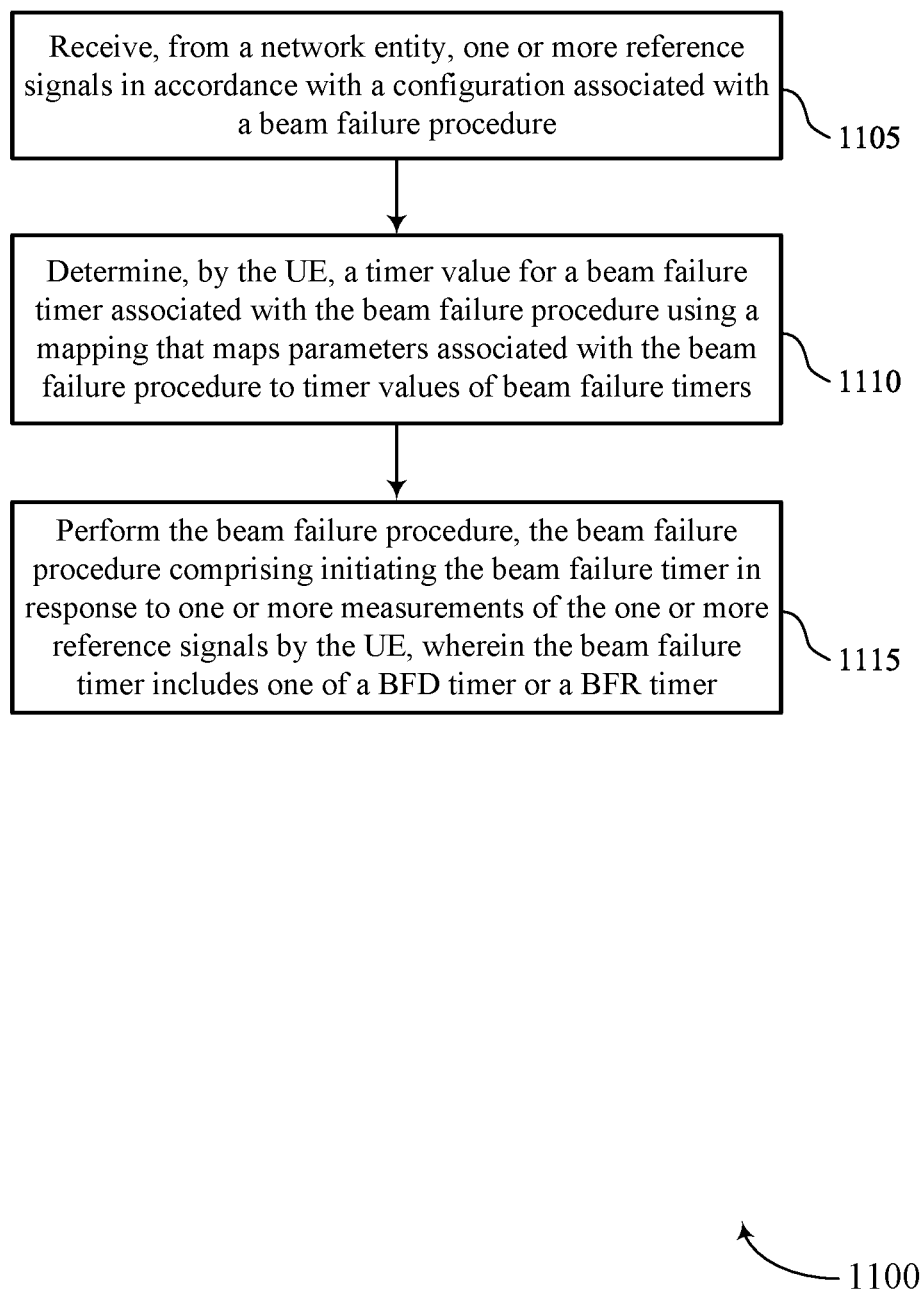

FIG. 11 illustrates a flowchart illustrating a method 1100 that supports techniques for beam failure detection and recovery. The operations of the method 1100 may be implemented by a UE or its components as described herein. For example, the operations of the method 1100 may be performed by a UE 115 as described with reference to FIGS. 1-7. In some implementations, a UE may execute a set of instructions to control the functional elements of the UE to perform the described functions. Additionally, or alternatively, the UE may perform aspects of the described functions using special-purpose hardware.

At 1105, the method may include receiving, from a network entity, one or more reference signals in accordance with a configuration associated with a beam failure procedure. The operations of 1105 may be performed in accordance with examples as disclosed herein.

At 1110, the method may include determining, by the UE, a timer value for a beam failure timer associated with the beam failure procedure using a mapping that maps parameters associated with the beam failure procedure to timer values of beam failure timers. The operations of 1110 may be performed in accordance with examples as disclosed herein.

At 1115, the method may include performing the beam failure procedure, the beam failure procedure including initiating the beam failure timer in response to one or more measurements of the one or more reference signals by the UE, where the beam failure timer is determined by the UE and the beam failure timer includes one of a BFD timer or a BFR timer. The operations of 1115 may be performed in accordance with examples as disclosed herein.

Figure 12:
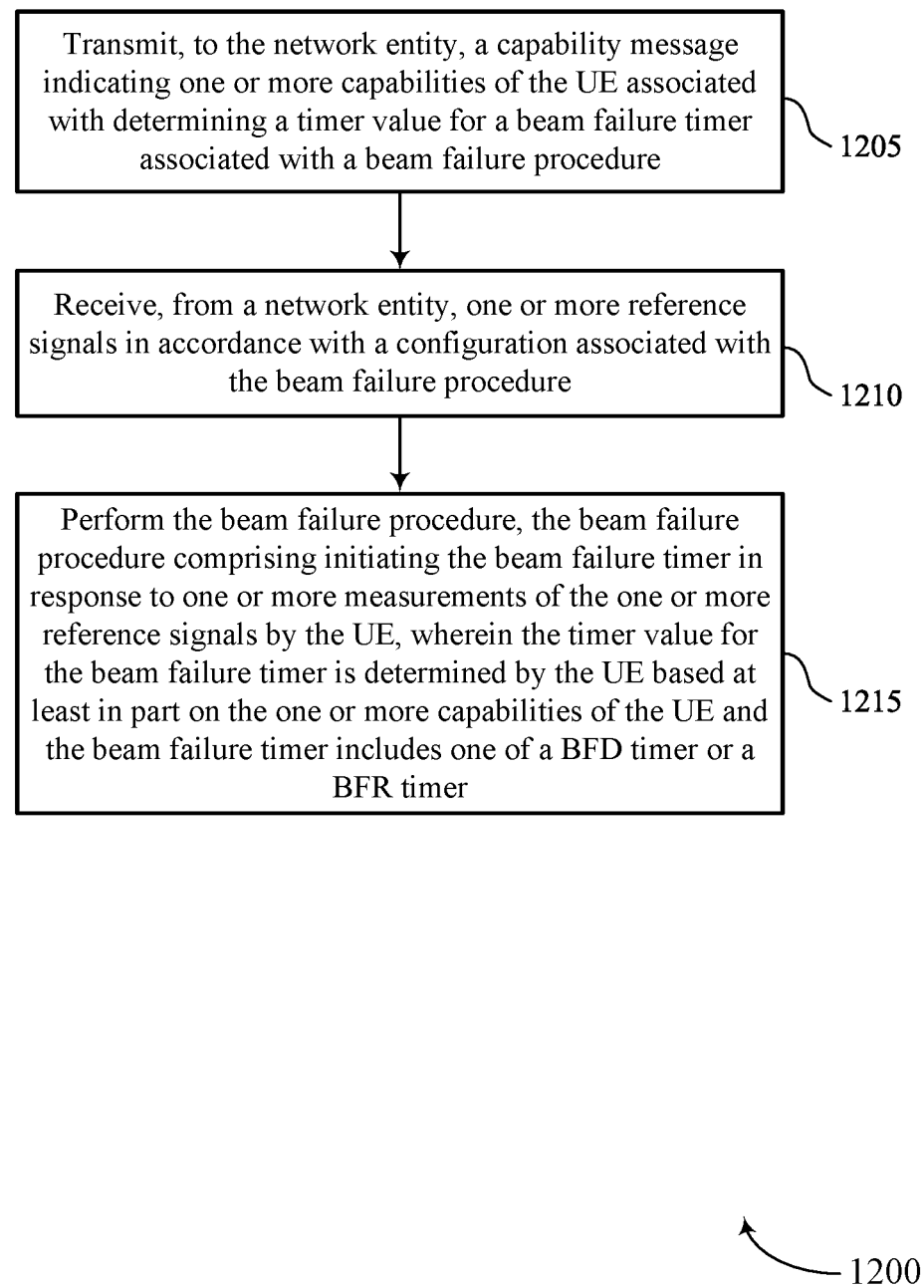

FIG. 12 illustrates a flowchart illustrating a method 1200 that supports techniques for beam failure detection and recovery. The operations of the method 1200 may be implemented by a UE or its components as described herein. For example, the operations of the method 1200 may be performed by a UE 115 as described with reference to FIGS. 1-7. In some implementations, a UE may execute a set of instructions to control the functional elements of the UE to perform the described functions. Additionally, or alternatively, the UE may perform aspects of the described functions using special-purpose hardware.

At 1205, the method may include transmitting, to the network entity, a capability message indicating one or more capabilities of the UE associated with determining a timer value for a beam failure timer associated with a beam failure procedure. The operations of 1205 may be performed in accordance with examples as disclosed herein.

At 1210, the method may include receiving, from a network entity, one or more reference signals in accordance with a configuration associated with the beam failure procedure. The operations of 1210 may be performed in accordance with examples as disclosed herein.

At 1215, the method may include performing the beam failure procedure, the beam failure procedure including initiating the beam failure timer in response to one or more measurements of the one or more reference signals by the UE, where the timer value for the beam failure timer is determined by the UE based at least in part on the one or more capabilities of the UE and the beam failure timer includes one of a BFD timer or a BFR timer. The operations of 1215 may be performed in accordance with examples as disclosed herein.

Figure 13:
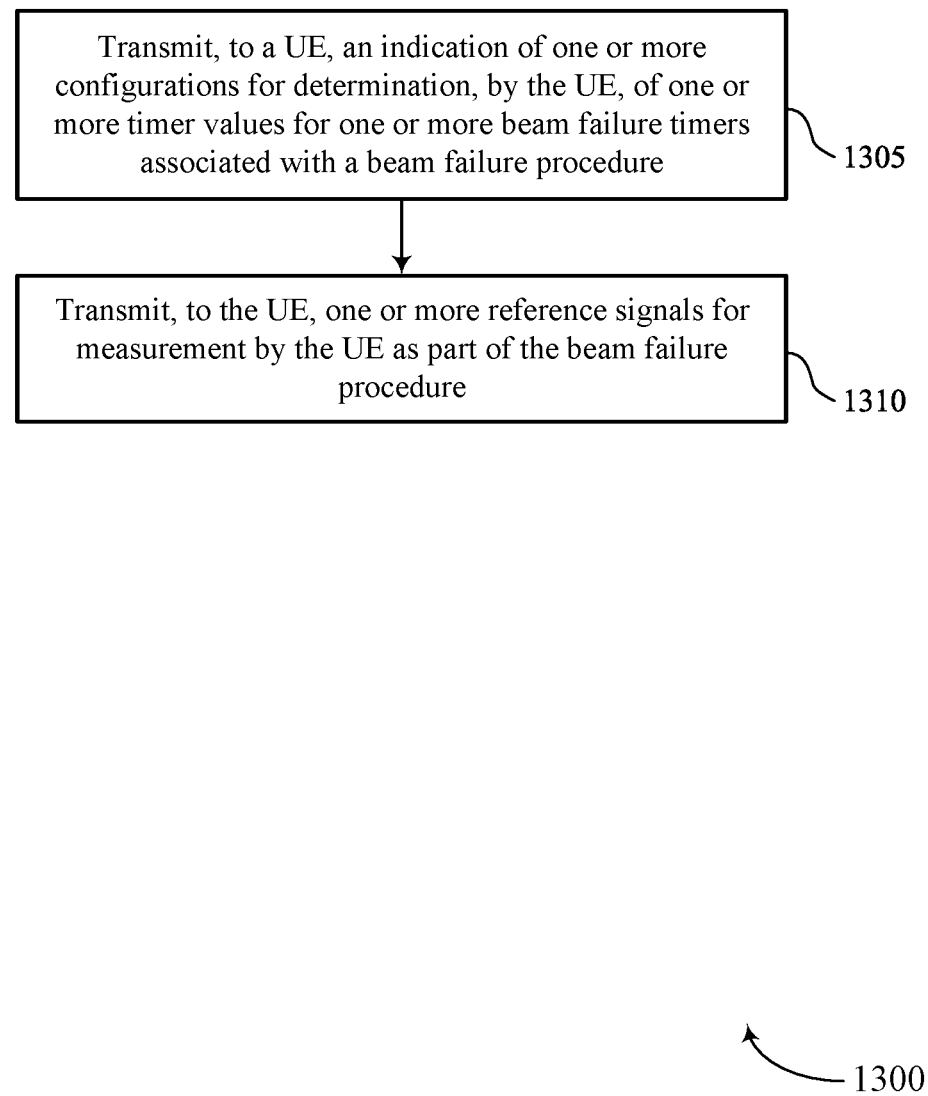

FIG. 13 illustrates a flowchart illustrating a method 1300 that supports techniques for beam failure detection and recovery. The operations of the method 1300 may be implemented by a BS or its components as described herein. For example, the operations of the method 1300 may be performed by a BS 105 as described with reference to FIGS. 1-6 and 8. In some implementations, a BS may execute a set of instructions to control the functional elements of the BS to perform the described functions. Additionally, or alternatively, the BS may perform aspects of the described functions using special-purpose hardware.

At 1305, the method may include transmitting, to a UE, an indication of one or more configurations for determination, by the UE, of one or more timer values for one or more beam failure timers associated with a beam failure procedure. The operations of 1305 may be performed in accordance with examples as disclosed herein.

At 1310, the method may include transmitting, to the UE, one or more reference signals for measurement by the UE as part of the beam failure procedure. The operations of 1310 may be performed in accordance with examples as disclosed herein.

Figure 14:
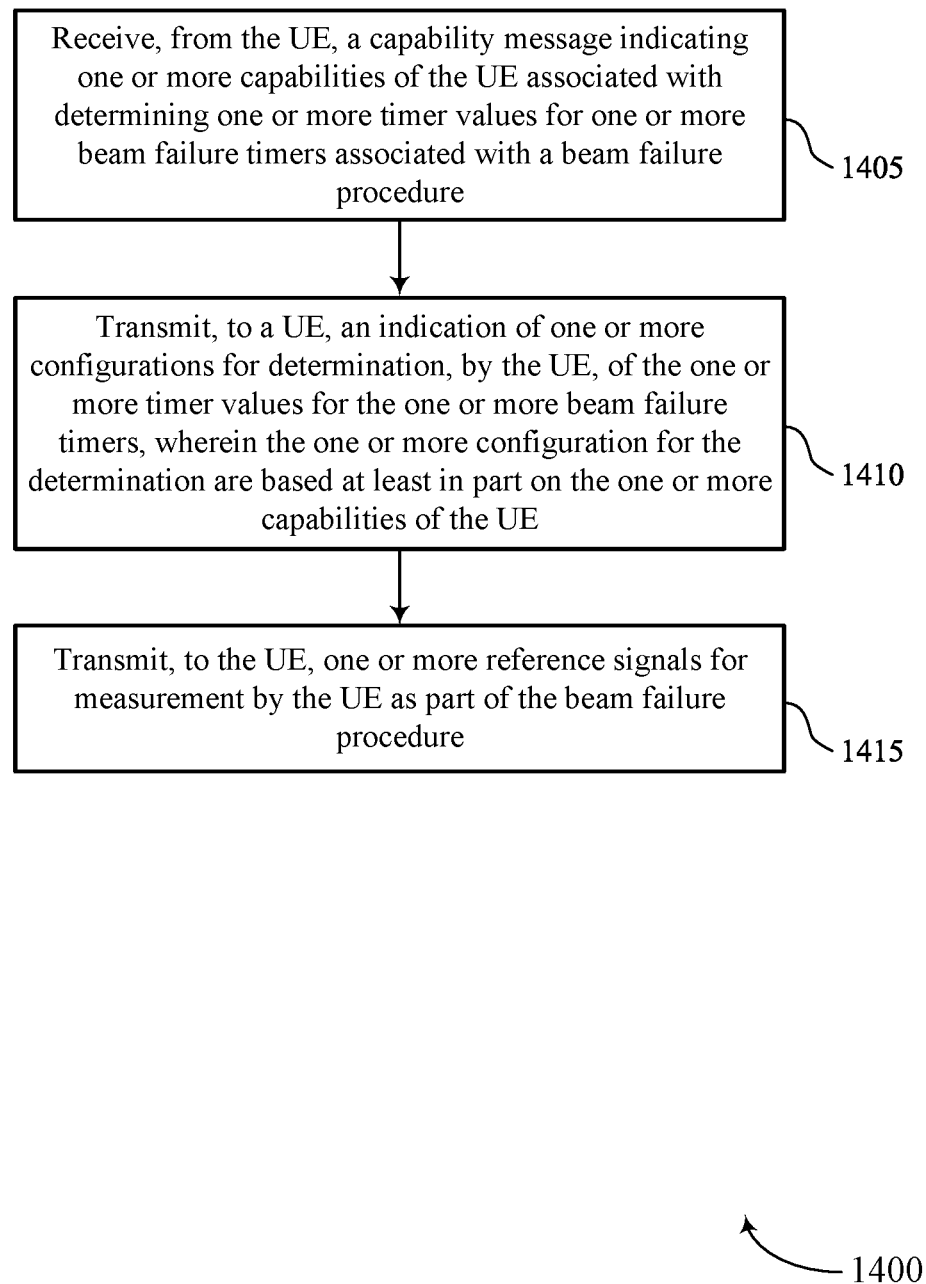

FIG. 14 illustrates a flowchart illustrating a method 1400 that supports techniques for beam failure detection and recovery. The operations of the method 1400 may be implemented by a BS or its components as described herein. For example, the operations of the method 1400 may be performed by a BS 105 as described with reference to FIGS. 1-6 and 8. In some implementations, a BS may execute a set of instructions to control the functional elements of the BS to perform the described functions. Additionally, or alternatively, the BS may perform aspects of the described functions using special-purpose hardware.

At 1405, the method may include receiving, from the UE, a capability message indicating one or more capabilities of the UE associated with determining one or more timer values for one or more beam failure timers associated with a beam failure procedure. The operations of 1405 may be performed in accordance with examples as disclosed herein.

At 1410, the method may include transmitting, to a UE, an indication of one or more configurations for determination, by the UE, of the one or more timer values for the one or more beam failure timers, where the one or more configuration for the determination are based at least in part on the one or more capabilities of the UE. The operations of 1410 may be performed in accordance with examples as disclosed herein.

At 1415, the method may include transmitting, to the UE, one or more reference signals for measurement by the UE as part of the beam failure procedure. The operations of 1415 may be performed in accordance with examples as disclosed herein.

Figure 15:
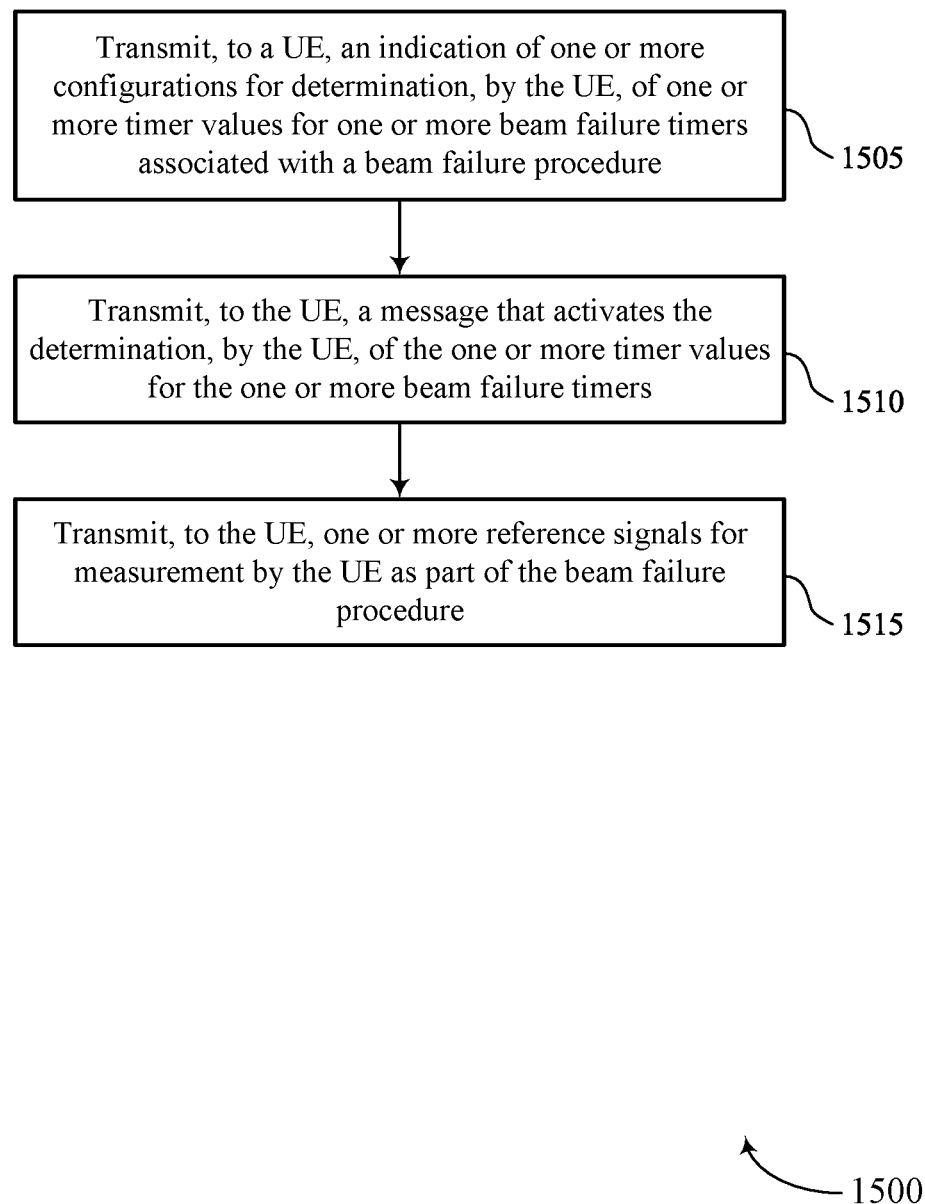

FIG. 15 illustrates a flowchart illustrating a method 1500 that supports techniques for beam failure detection and recovery. The operations of the method 1500 may be implemented by a BS or its components as described herein. For example, the operations of the method 1500 may be performed by a BS 105 as described with reference to FIGS. 1-6 and 8. In some implementations, a BS may execute a set of instructions to control the functional elements of the BS to perform the described functions. Additionally, or alternatively, the BS may perform aspects of the described functions using special-purpose hardware.

At 1505, the method may include transmitting, to a UE, an indication of one or more configurations for determination, by the UE, of one or more timer values for one or more beam failure timers associated with a beam failure procedure. The operations of 1505 may be performed in accordance with examples as disclosed herein.

At 1510, the method may include transmitting, to the UE, a message that activates the determination, by the UE, of the one or more timer values for the one or more beam failure timers. The operations of 1510 may be performed in accordance with examples as disclosed herein.

At 1515, the method may include transmitting, to the UE, one or more reference signals for measurement by the UE as part of the beam failure procedure. The operations of 1515 may be performed in accordance with examples as disclosed herein.

The following provides an overview of some aspects of the present disclosure:

Aspect 1: A method for wireless communication at a UE, including: receiving, from a network entity, one or more reference signals in accordance with a configuration associated with a beam failure procedure; and performing the beam failure procedure, the beam failure procedure including initiating a beam failure timer in response to one or more measurements of the one or more reference signals by the UE, where the beam failure timer is determined by the UE and the beam failure timer includes one of a BFD timer or a BFR timer.

Aspect 2: The method of aspect 1, further including: determining, by the UE, a timer value for the beam failure timer using an ML model.

Aspect 3: The method of aspect 2, where determining the timer value for the beam failure timer includes: inputting a set of parameters associated with the beam failure procedure into the ML model that outputs the timer value for the beam failure timer.

Aspect 4: The method of aspect 3, where the set of parameters associated with the beam failure procedure includes an SINR associated with communications between the UE and the network entity, an RSRP associated with the communications, an SNR associated with the communications, a quantity of BFIs generated by the UE within a past duration, a quantity of available preambles for performing a CFRA procedure, or a combination thereof.

Aspect 5: The method of aspect 1, further including: determining, by the UE, a timer value for the beam failure timer using a mapping that maps parameters associated with the beam failure procedure to timer values of beam failure timers.

Aspect 6: The method of aspect 5, where the parameters associated with the beam failure procedure include an SINR associated with communications between the UE and the network entity, an RSRP associated with the communications, an SNR associated with the communications, a quantity of BFIs generated by the UE within a past duration, a quantity of available preambles for performing a CFRA procedure, or a combination thereof.

Aspect 7: The method of any of aspects 1 through 6, further including: transmitting, to the network entity, a capability message indicating one or more capabilities of the UE associated with determining a timer value for the beam failure timer, where the timer value for the beam failure timer is determined by the UE based on the one or more capabilities of the UE.

Aspect 8: The method of aspect 7, further including: receiving, from the network entity, a request to report the one or more capabilities of the UE, where transmitting the capability message is in response to receiving the request.

Aspect 9: The method of any of aspects 7 through 8, where the one or more capabilities of the UE include a capability of the UE to determine the timer value for the beam failure timer, a capability associated with using ML models to determine the timer value for the beam failure timer, a processing power of the UE, a processing capacity of the UE, a memory storage of the UE, computation resources available to the UE for using the ML models, or a combination thereof.

Aspect 10: The method of any of aspects 1 through 9, further including: receiving, from the network entity, a message that activates determination by the UE of timer values for beam failure timers for one or more beam failure procedures, the one or more beam failure procedures including the beam failure procedure, where a timer value for the beam failure timer is determined by the UE in response to receiving the message.

Aspect 11: The method of aspect 10, further including: transmitting, to the network entity, a request to activate the determination of the timer values for the beam failure timers for the one or more beam failure procedures, where receiving the message is in response to transmitting the request.

Aspect 12: The method of any of aspects 10 through 11, further including: receiving, from the network entity, a second message that deactivates determination by the UE of timer values for beam failure timers for one or more second beam failure procedures; and performing a second beam failure procedure of the one or more second beam failure procedures in accordance with a second beam failure timer, where a second timer value for the second beam failure timer is configured by the network entity.

Aspect 13: The method of aspect 12, further including: transmitting, to the network entity, a request to deactivate the determination of the timer values for the beam failure timers for the one or more second beam failure procedures, where receiving the second message is in response to transmitting the request.

Aspect 14: The method of any of aspects 1 through 13, further including: receiving, from the network entity, one or more control messages indicating one or more ML models for beam failure timer value determination, one or more mappings that map parameters associated with the beam failure procedure to timer values of beam failure timers, or a combination thereof, the beam failure timer determined using an ML model of the one or more ML models or a mapping of the one or more mappings.

Aspect 15: The method of aspect 14, further including: receiving, from the network entity, an indication for the UE to use the ML model or the mapping.

Aspect 16: The method of any of aspects 1 through 13, where one or more ML models for beam failure timer value determination, one or more mappings that map parameters associated with the beam failure procedure to timer values of beam failure timers, or a combination thereof, are configured at the UE during a factory setup of the UE, the beam failure timer determined using an ML model of the one or more ML models or a mapping of the one or more mappings.

Aspect 17: The method of any of aspects 1 through 16, where the beam failure procedure includes a BFD procedure, the method further including: determining, by the UE, a first timer value for a first BFD timer used in counting a first type of BFI during the BFD procedure; and determining, by the UE, a second timer value for a second BFD timer used in counting a second type of BFI during the BFD procedure, where the beam failure timer corresponds to the first BFD timer or the second BFD timer based on a type of BFI counted during the BFD procedure.

Aspect 18: The method of any of aspects 1 through 17, where the beam failure procedure includes a BFD procedure, where performing the beam failure procedure includes: generating a set of BFIs in response to receiving the one or more reference signals, where generating a threshold quantity of BFIs prior to an expiration of the beam failure timer indicates beam failure.

Aspect 19: The method of any of aspects 1 through 16, where the beam failure procedure includes a BFR procedure, where performing the beam failure procedure includes: performing one or more CFRA procedures prior to an expiration of the beam failure timer.

Aspect 20: The method of aspect 19, where performing the beam failure procedure includes: performing one or more CBRA procedures prior after the expiration of the beam failure timer based on failing to re-establish a connection with the network entity via the one or more CFRA procedures.

Aspect 21: A method for wireless communication at a network entity, including, including: transmitting, to a UE, an indication of one or more configurations for determination, by the UE, of one or more timer values for one or more beam failure timers associated with a beam failure procedure; and transmitting, to the UE, one or more reference signals for measurement by the UE as part of the beam failure procedure.

Aspect 22: The method of aspect 21, where the one or more configurations for the determination include one or more ML models for beam failure timer value determination.

Aspect 23: The method of aspect 21, where the one or more configurations for the determination include one or more mappings that map parameters associated with the beam failure procedure to timer values of beam failure timers.

Aspect 24: The method of any of aspects 21 through 23, further including: receiving, from the UE, a capability message indicating one or more capabilities of the UE associated with determining the one or more timer values for the one or more beam failure timers, where the one or more configurations for the determination are based on the one or more capabilities of the UE.

Aspect 25: The method of aspect 24, further including: transmitting, to the UE, a request to report the one or more capabilities of the UE, where receiving the capability message is in response to transmitting the request.

Aspect 26: The method of any of aspects 21 through 25, further including: transmitting, to the UE, a message that activates the determination, by the UE, of the one or more timer values for the one or more beam failure timers.

Aspect 27: The method of any of aspects 21 through 26, further including: transmitting, to the UE, a message that deactivates the determination, by the UE, of the one or more timer values for the one or more beam failure timers.

Aspect 28: The method of any of aspects 21 through 27, where the beam failure procedure includes a BFD procedure or a BFR procedure.

Aspect 29: An apparatus for wireless communications, including: a first interface configured to: obtain, for a UE and from a network entity, one or more reference signals in accordance with a configuration associated with a beam failure procedure; and a processing system configured to: perform the beam failure procedure, the beam failure procedure including initiating a beam failure timer in response to one or more measurements of the one or more reference signals by the UE, where the beam failure timer is determined by the UE and the beam failure timer includes one of a BFD timer or a BFR timer.

Aspect 30: The apparatus of aspect 29, where the processing system is further configured to: determine, by the UE, a timer value for the beam failure timer using an ML model.

Aspect 31: The apparatus of aspect 30, where, to determine the timer value for the beam failure timer, the processing system is further configured to: input a set of parameters associated with the beam failure procedure into the ML model that outputs the timer value for the beam failure timer Aspect 32: The apparatus of aspect 31, where the set of parameters associated with the beam failure procedure includes an SINR associated with communications between the UE and the network entity, an RSRP associated with the communications, an SNR associated with the communications, a quantity of BFIs generated by the UE within a past duration, a quantity of available preambles for performing a CFRA procedure, or a combination thereof.

Aspect 33: The apparatus of aspect 29, where the processing system is further configured to: determine, by the UE, a timer value for the beam failure timer using a mapping that maps parameters associated with the beam failure procedure to timer values of beam failure timers.

Aspect 34: The apparatus of aspect 33, where the parameters associated with the beam failure procedure include an SINR associated with communications between the UE and the network entity, an RSRP associated with the communications, an SNR associated with the communications, a quantity of BFIs generated by the UE within a past duration, a quantity of available preambles for performing a CFRA procedure, or a combination thereof.

Aspect 35: The apparatus of any of aspects 29 through 34, further including: a second interface, where the first interface or the second interface is configured to: output, from the UE to the network entity, a capability message indicating one or more capabilities of the UE associated with determining a timer value for the beam failure timer, where the timer value for the beam failure timer is determined by the UE based on the one or more capabilities of the UE.

Aspect 36: The apparatus of aspect 35, where the first interface is further configured to: obtain, for the UE from the network entity, a request to report the one or more capabilities of the UE, where the first interface or the second interface is configured to output the capability message in response to obtaining the request.

Aspect 37: The apparatus of any of aspects 35 through 36, where the one or more capabilities of the UE include a capability of the UE to determine the timer value for the beam failure timer, a capability associated with using ML models to determine the timer value for the beam failure timer, a processing power of the UE, a processing capacity of the UE, a memory storage of the UE, computation resources available to the UE for using the ML models, or a combination thereof.

Aspect 38: The apparatus of any of aspects 29 through 37, where the first interface is further configured to: obtain, for the UE from the network entity, a message that activates determination by the UE of timer values for beam failure timers for one or more beam failure procedures, the one or more beam failure procedures including the beam failure procedure, where the processing system is configured to determine a timer value for the beam failure timer by the UE in response to receiving the message.

Aspect 39: The apparatus of aspect 38, further including: a second interface, where the first interface or the second interface is configured to: output, from the UE to the network entity, a request to activate the determination of the timer values for the beam failure timers for the one or more beam failure procedures, where first interface is configured to obtain the message is in response to outputting the request.

Aspect 40: The apparatus of any of aspects 38 through 39, where: the first interface is further configured to: obtain, for the UE from the network entity, a second message that deactivates determination by the UE of timer values for beam failure timers for one or more second beam failure procedures; and the processing system is further configured to: perform a second beam failure procedure of the one or more second beam failure procedures in accordance with a second beam failure timer, where a second timer value for the second beam failure timer is configured by the network entity.

Aspect 41: The apparatus of aspect 40, further including: a second interface, where the first interface or the second interface is configured to: output, from the UE to the network entity, a request to deactivate the determination of the timer values for the beam failure timers for the one or more second beam failure procedures, where the first interface is configured to obtain the second message in response to outputting the request.

Aspect 42: The apparatus of any of aspects 29 through 41, where the first interface is further configured to: obtain, for the UE from the network entity, one or more control messages indicating one or more ML models for beam failure timer value determination, one or more mappings that map parameters associated with the beam failure procedure to timer values of beam failure timers, or a combination thereof, the beam failure timer determined using an ML model of the one or more ML models or a mapping of the one or more mappings.

Aspect 43: The apparatus of aspect 42, where the first interface is further configured to: obtain, for the UE from the network entity, an indication for the UE to use the ML model or the mapping.

Aspect 44: The apparatus of any of aspects 29 through 41, where one or more ML models for beam failure timer value determination, one or more mappings that map parameters associated with the beam failure procedure to timer values of beam failure timers, or a combination thereof, are configured at the UE during a factory setup of the UE, the beam failure timer determined using an ML model of the one or more ML models or a mapping of the one or more mappings.

Aspect 45: The apparatus of any of aspects 29 through 44, where: the beam failure procedure includes a BFD procedure; and the processing system is further configured to: determine, by the UE, a first timer value for a first BFD timer used in counting a first type of BFI during the BFD procedure; and determine, by the UE, a second timer value for a second BFD timer used in counting a second type of BFI during the BFD procedure, where the beam failure timer corresponds to the first BFD timer or the second BFD timer based on a type of BFI counted during the BFD procedure.

Aspect 46: The apparatus of any of aspects 29 through 45, where: the beam failure procedure includes a BFD procedure; and to perform the beam failure procedure, the processing system is configured to: generate a set of BFIs in response to obtaining the one or more reference signals, where generating a threshold quantity of BFIs prior to an expiration of the beam failure timer indicates beam failure.

Aspect 47: The apparatus of any of aspects 29 through 44, where: the beam failure procedure includes a BFR procedure; and to perform the beam failure procedure, the processing system is configured to: performing one or more CFRA procedures prior to an expiration of the beam failure timer.

Aspect 48: The apparatus of aspect 47, where, to perform the beam failure procedure, the processing system is further configured to: perform one or more CBRA procedures prior after the expiration of the beam failure timer based on failing to re-establish a connection with the network entity via the one or more CFRA procedures.

Aspect 49: An apparatus for wireless communications, including: a first interface configured to: output, from a network entity to a UE, an indication of one or more configurations for determination, by the UE, of one or more timer values for one or more beam failure timers associated with a beam failure procedure; and output, from the network entity to the UE, one or more reference signals for measurement by the UE as part of the beam failure procedure.

Aspect 50: The apparatus of aspect 49, where the one or more configurations for the determination include one or more ML models for beam failure timer value determination.

Aspect 51: The apparatus of aspect 49, where the one or more configurations for the determination include one or more mappings that map parameters associated with the beam failure procedure to timer values of beam failure timers.

Aspect 52: The apparatus of any of aspects 49 through 51, further including: a second interface, where the first interface or the second interface is configured to: obtain, by the network entity from the UE, a capability message indicating one or more capabilities of the UE associated with determining the one or more timer values for the one or more beam failure timers, where the one or more configurations for the determination are based on the one or more capabilities of the UE.

Aspect 53: The apparatus of aspect 52, where the first interface is further configured to: output, from the network entity to the UE, a request to report the one or more capabilities of the UE, where the first interface or the second interface is configured to obtain the capability message in response to outputting the request.

Aspect 54: The apparatus of any of aspects 49 through 53, where the first interface is further configured to: output, from the network entity to the UE, a message that activates the determination, by the UE, of the one or more timer values for the one or more beam failure timers.

Aspect 55: The apparatus of any of aspects 49 through 54, where the first interface is further configured to: output, from the network entity to the UE, a message that deactivates the determination, by the UE, of the one or more timer values for the one or more beam failure timers.

Aspect 56: The apparatus of any of aspects 49 through 55, where the beam failure procedure includes a BFD procedure or a BFR procedure.

Aspect 57: An apparatus for wireless communication at a UE, including: a processor; memory coupled with the processor; and instructions stored in the memory and executable by the processor to cause the apparatus to: receive, from a network entity, one or more reference signals in accordance with a configuration associated with a beam failure procedure; and perform the beam failure procedure, the beam failure procedure including initiating a beam failure timer in response to one or more measurements of the one or more reference signals by the UE, where the beam failure timer is determined by the UE and the beam failure timer includes one of a BFD timer or a BFR timer.

Aspect 58: The apparatus of aspect 57, where the instructions are further executable by the processor to cause the apparatus to: determine, by the UE, a timer value for the beam failure timer using an ML model.

Aspect 59: The apparatus of aspect 58, where the instructions to determine the timer value for the beam failure timer are executable by the processor to cause the apparatus to: input a set of parameters associated with the beam failure procedure into the ML model that outputs the timer value for the beam failure timer.

Aspect 60: The apparatus of aspect 59, where the set of parameters associated with the beam failure procedure includes an SINR associated with communications between the UE and the network entity, an RSRP associated with the communications, an SNR associated with the communications, a quantity of BFIs generated by the UE within a past duration, a quantity of available preambles for performing a CFRA procedure, or a combination thereof.

Aspect 1: The apparatus of aspect 57, where the instructions are further executable by the processor to cause the apparatus to: determine, by the UE, a timer value for the beam failure timer using a mapping that maps parameters associated with the beam failure procedure to timer values of beam failure timers.

Aspect 62: The apparatus of aspect 61, where the parameters associated with the beam failure procedure include an SINR associated with communications between the UE and the network entity, an RSRP associated with the communications, an SNR associated with the communications, a quantity of BFIs generated by the UE within a past duration, a quantity of available preambles for performing a CFRA procedure, or a combination thereof.

Aspect 63: The apparatus of any of aspects 57 through 62, where the instructions are further executable by the processor to cause the apparatus to: transmit, to the network entity, a capability message indicating one or more capabilities of the UE associated with determining a timer value for the beam failure timer, where the timer value for the beam failure timer is determined by the UE based on the one or more capabilities of the UE.

Aspect 64: The apparatus of aspect 63, where the instructions are further executable by the processor to cause the apparatus to: receive, from the network entity, a request to report the one or more capabilities of the UE, where transmitting the capability message is in response to receiving the request.

Aspect 65: The apparatus of any of aspects 63 through 64, where the one or more capabilities of the UE include a capability of the UE to determine the timer value for the beam failure timer, a capability associated with using ML models to determine the timer value for the beam failure timer, a processing power of the UE, a processing capacity of the UE, a memory storage of the UE, computation resources available to the UE for using the ML models, or a combination thereof.

Aspect 66: The apparatus of any of aspects 57 through 65, where the instructions are further executable by the processor to cause the apparatus to: receive, from the network entity, a message that activates determination by the UE of timer values for beam failure timers for one or more beam failure procedures, the one or more beam failure procedures including the beam failure procedure, where a timer value for the beam failure timer is determined by the UE in response to receiving the message.

Aspect 67: The apparatus of aspect 66, where the instructions are further executable by the processor to cause the apparatus to: transmit, to the network entity, a request to activate the determination of the timer values for the beam failure timers for the one or more beam failure procedures, where receiving the message is in response to transmitting the request.

Aspect 68: The apparatus of any of aspects 66 through 67, where the instructions are further executable by the processor to cause the apparatus to: receive, from the network entity, a second message that deactivates determination by the UE of timer values for beam failure timers for one or more second beam failure procedures; and perform a second beam failure procedure of the one or more second beam failure procedures in accordance with a second beam failure timer, where a second timer value for the second beam failure timer is configured by the network entity.

Aspect 69: The apparatus of aspect 68, where the instructions are further executable by the processor to cause the apparatus to: transmit, to the network entity, a request to deactivate the determination of the timer values for the beam failure timers for the one or more second beam failure procedures, where receiving the second message is in response to transmitting the request.

Aspect 70: The apparatus of any of aspects 57 through 69, where the instructions are further executable by the processor to cause the apparatus to: receive, from the network entity, one or more control messages indicating one or more ML models for beam failure timer value determination, one or more mappings that map parameters associated with the beam failure procedure to timer values of beam failure timers, or a combination thereof, the beam failure timer determined using an ML model of the one or more ML models or a mapping of the one or more mappings.

Aspect 71: The apparatus of aspect 70, where the instructions are further executable by the processor to cause the apparatus to: receive, from the network entity, an indication for the UE to use the ML model or the mapping.

Aspect 72: The apparatus of any of aspects 57 through 69, where one or more ML models for beam failure timer value determination, one or more mappings that map parameters associated with the beam failure procedure to timer values of beam failure timers, or a combination thereof, are configured at the UE during a factory setup of the UE, the beam failure timer determined using an ML model of the one or more ML models or a mapping of the one or more mappings.

Aspect 73: The apparatus of any of aspects 57 through 72, where the beam failure procedure includes a BFD procedure, and the instructions are further executable by the processor to cause the apparatus to: determine, by the UE, a first timer value for a first BFD timer used in counting a first type of BFI during the BFD procedure; and determine, by the UE, a second timer value for a second BFD timer used in counting a second type of BFI during the BFD procedure, where the beam failure timer corresponds to the first BFD timer or the second BFD timer based on a type of BFI counted during the BFD procedure.

Aspect 74: The apparatus of any of aspects 57 through 73, where the instructions to perform the beam failure procedure are executable by the processor to cause the apparatus to: generate a set of BFIs in response to receiving the one or more reference signals, where generating a threshold quantity of BFIs prior to an expiration of the beam failure timer indicates beam failure.

Aspect 75: The apparatus of any of aspects 57 through 72, where the beam failure procedure includes a BFR procedure, and the instructions to perform the beam failure procedure are executable by the processor to cause the apparatus to: perform one or more CFRA procedures prior to an expiration of the beam failure timer.

Aspect 76: The apparatus of aspect 75, where the instructions to perform the beam failure procedure are executable by the processor to cause the apparatus to: perform one or more CBRA procedures prior after the expiration of the beam failure timer based on failing to re-establish a connection with the network entity via the one or more CFRA procedures.

Aspect 77: An apparatus for wireless communication at a network entity, including: a processor; memory coupled with the processor; and instructions stored in the memory and executable by the processor to cause the apparatus to: transmit, to a UE, an indication of one or more configurations for determination, by the UE, of one or more timer values for one or more beam failure timers associated with a beam failure procedure; and transmit, to the UE, one or more reference signals for measurement by the UE as part of the beam failure procedure.

Aspect 78: The apparatus of aspect 77, where: the one or more configurations for the determination include one or more ML models for beam failure timer value determination.

Aspect 79: The apparatus of aspect 77, where the one or more configurations for the determination include one or more mappings that map parameters associated with the beam failure procedure to timer values of beam failure timers.

Aspect 80: The apparatus of any of aspects 77 through 79, where the instructions are further executable by the processor to cause the apparatus to: receive, from the UE, a capability message indicating one or more capabilities of the UE associated with determining the one or more timer values for the one or more beam failure timers, where the one or more configurations for the determination are based on the one or more capabilities of the UE.

Aspect 81: The apparatus of aspect 80, where the instructions are further executable by the processor to cause the apparatus to: transmit, to the UE, a request to report the one or more capabilities of the UE, where receiving the capability message is in response to transmitting the request.

Aspect 82: The apparatus of any of aspects 77 through 81, where the instructions are further executable by the processor to cause the apparatus to: transmit, to the UE, a message that activates the determination, by the UE, of the one or more timer values for the one or more beam failure timers.

Aspect 83: The apparatus of any of aspects 77 through 82, where the instructions are further executable by the processor to cause the apparatus to: transmit, to the UE, a message that deactivates the determination, by the UE, of the one or more timer values for the one or more beam failure timers.

Aspect 84: The apparatus of any of aspects 77 through 83, where the beam failure procedure includes a BFD procedure or a BFR procedure.

Aspect 85: An apparatus for wireless communication at a UE, including: means for receiving, from a network entity, one or more reference signals in accordance with a configuration associated with a beam failure procedure; and means for performing the beam failure procedure, the beam failure procedure including initiating a beam failure timer in response to one or more measurements of the one or more reference signals by the UE, where the beam failure timer is determined by the UE and the beam failure timer includes one of a BFD timer or a BFR timer.

Aspect 86: The apparatus of aspect 85, further including: means for determining, by the UE, a timer value for the beam failure timer using an ML model.

Aspect 87: The apparatus of aspect 86, where the means for determining the timer value for the beam failure timer include: means for inputting a set of parameters associated with the beam failure procedure into the ML model that outputs the timer value for the beam failure timer.

Aspect 88: The apparatus of aspect 87, where the set of parameters associated with the beam failure procedure includes an SINR associated with communications between the UE and the network entity, an RSRP associated with the communications, an SNR associated with the communications, a quantity of BFIs generated by the UE within a past duration, a quantity of available preambles for performing a CFRA procedure, or a combination thereof.

Aspect 89: The apparatus of aspect 85, further including: means for determining, by the UE, a timer value for the beam failure timer using a mapping that maps parameters associated with the beam failure procedure to timer values of beam failure timers.

Aspect 90: The apparatus of aspect 89, where: the parameters associated with the beam failure procedure include an SINR associated with communications between the UE and the network entity, an RSRP associated with the communications, an SNR associated with the communications, a quantity of BFIs generated by the UE within a past duration, a quantity of available preambles for performing a CFRA procedure, or a combination thereof.

Aspect 91: The apparatus of any of aspects 85 through 90, further including: means for transmitting, to the network entity, a capability message indicating one or more capabilities of the UE associated with determining a timer value for the beam failure timer, where the timer value for the beam failure timer is determined by the UE based on the one or more capabilities of the UE.

Aspect 92: The apparatus of aspect 91, further including: means for receiving, from the network entity, a request to report the one or more capabilities of the UE, where transmitting the capability message is in response to receiving the request.

Aspect 93: The apparatus of any of aspects 91 through 92, where: the one or more capabilities of the UE include a capability of the UE to determine the timer value for the beam failure timer, a capability associated with using ML models to determine the timer value for the beam failure timer, a processing power of the UE, a processing capacity of the UE, a memory storage of the UE, computation resources available to the UE for using the ML models, or a combination thereof.

Aspect 94: The apparatus of any of aspects 85 through 93, further including: means for receiving, from the network entity, a message that activates determination by the UE of timer values for beam failure timers for one or more beam failure procedures, the one or more beam failure procedures including the beam failure procedure, where a timer value for the beam failure timer is determined by the UE in response to receiving the message.

Aspect 95: The apparatus of aspect 94, further including: means for transmitting, to the network entity, a request to activate the determination of the timer values for the beam failure timers for the one or more beam failure procedures, where receiving the message is in response to transmitting the request.

Aspect 96: The apparatus of any of aspects 94 through 95, further including: means for receiving, from the network entity, a second message that deactivates determination by the UE of timer values for beam failure timers for one or more second beam failure procedures; and means for performing a second beam failure procedure of the one or more second beam failure procedures in accordance with a second beam failure timer, where a second timer value for the second beam failure timer is configured by the network entity.

Aspect 97: The apparatus of aspect 96, further including: means for transmitting, to the network entity, a request to deactivate the determination of the timer values for the beam failure timers for the one or more second beam failure procedures, where receiving the second message is in response to transmitting the request.

Aspect 98: The apparatus of any of aspects 85 through 97, further including: means for receiving, from the network entity, one or more control messages indicating one or more ML models for beam failure timer value determination, one or more mappings that map parameters associated with the beam failure procedure to timer values of beam failure timers, or a combination thereof, the beam failure timer determined using an ML model of the one or more ML models or a mapping of the one or more mappings.

Aspect 99: The apparatus of aspect 98, further including: means for receiving, from the network entity, an indication for the UE to use the ML model or the mapping.

Aspect 100: The apparatus of any of aspects 85 through 97, where one or more ML models for beam failure timer value determination, one or more mappings that map parameters associated with the beam failure procedure to timer values of beam failure timers, or a combination thereof, are configured at the UE during a factory setup of the UE, the beam failure timer determined using an ML model of the one or more ML models or a mapping of the one or more mappings.

Aspect 101: The apparatus of any of aspects 85 through 100, where the beam failure procedure includes a BFD procedure, the apparatus further including: means for determining, by the UE, a first timer value for a first BFD timer used in counting a first type of BFI during the BFD procedure; and means for determining, by the UE, a second timer value for a second BFD timer used in counting a second type of BFI during the BFD procedure, where the beam failure timer corresponds to the first BFD timer or the second BFD timer based on a type of BFI counted during the BFD procedure.

Aspect 102: The apparatus of any of aspects 85 through 101, where the means for performing the beam failure procedure include: means for generating a set of BFIs in response to receiving the one or more reference signals, where generating a threshold quantity of BFIs prior to an expiration of the beam failure timer indicates beam failure.

Aspect 103: The apparatus of any of aspects 85 through 100, where the beam failure procedure includes a BFD procedure, and where the means for performing the beam failure procedure include: means for performing one or more CFRA procedures prior to an expiration of the beam failure timer.

Aspect 104: The apparatus of aspect 103, where the means for performing the beam failure procedure include: means for performing one or more CBRA procedures prior after the expiration of the beam failure timer based on failing to re-establish a connection with the network entity via the one or more CFRA procedures.

Aspect 105: An apparatus for wireless communication at a network entity, including: means for transmitting, to a UE, an indication of one or more configurations for determination, by the UE, of one or more timer values for one or more beam failure timers associated with a beam failure procedure; and means for transmitting, to the UE, one or more reference signals for measurement by the UE as part of the beam failure procedure.

Aspect 106: The apparatus of aspect 105, where: the one or more configurations for the determination include one or more ML models for beam failure timer value determination.

Aspect 107: The apparatus of aspect 105, where: the one or more configurations for the determination include one or more mappings that map parameters associated with the beam failure procedure to timer values of beam failure timers.

Aspect 108: The apparatus of any of aspects 105 through 107, further including: means for receiving, from the UE, a capability message indicating one or more capabilities of the UE associated with determining the one or more timer values for the one or more beam failure timers, where the one or more configurations for the determination are based on the one or more capabilities of the UE.

Aspect 109: The apparatus of aspect 108, further including: means for transmitting, to the UE, a request to report the one or more capabilities of the UE, where receiving the capability message is in response to transmitting the request.

Aspect 110: The apparatus of any of aspects 105 through 109, further including: means for transmitting, to the UE, a message that activates the determination, by the UE, of the one or more timer values for the one or more beam failure timers.

Aspect 111: The apparatus of any of aspects 105 through 110, further including: means for transmitting, to the UE, a message that deactivates the determination, by the UE, of the one or more timer values for the one or more beam failure timers.

Aspect 112: The apparatus of any of aspects 105 through 111, where the beam failure procedure includes a BFD procedure or a BFR procedure.

Aspect 113: A non-transitory computer-readable medium storing code for wireless communication at a UE, the code including instructions executable by a processor to: receive, from a network entity, one or more reference signals in accordance with a configuration associated with a beam failure procedure; and perform the beam failure procedure, the beam failure procedure including initiating a beam failure timer in response to one or more measurements of the one or more reference signals by the UE, where the beam failure timer is determined by the UE and the beam failure timer includes one of a BFD timer or a BFR timer.

Aspect 114: The non-transitory computer-readable medium of aspect 113, where the instructions are further executable by the processor to: determine, by the UE, a timer value for the beam failure timer using an ML model.

Aspect 115: The non-transitory computer-readable medium of aspect 114, where the instructions to determine the timer value for the beam failure timer are executable by the processor to: input a set of parameters associated with the beam failure procedure into the ML model that outputs the timer value for the beam failure timer.

Aspect 116: The non-transitory computer-readable medium of aspect 115, where the set of parameters associated with the beam failure procedure includes an SINR associated with communications between the UE and the network entity, an RSRP associated with the communications, an SNR associated with the communications, a quantity of BFIs generated by the UE within a past duration, a quantity of available preambles for performing a CFRA procedure, or a combination thereof.

Aspect 117: The non-transitory computer-readable medium of aspect 113, where the instructions are further executable by the processor to: determine, by the UE, a timer value for the beam failure timer using a mapping that maps parameters associated with the beam failure procedure to timer values of beam failure timers.

Aspect 118: The non-transitory computer-readable medium of aspect 117, where the parameters associated with the beam failure procedure include an SINR associated with communications between the UE and the network entity, an RSRP associated with the communications, an SNR associated with the communications, a quantity of BFIs generated by the UE within a past duration, a quantity of available preambles for performing a CFRA procedure, or a combination thereof.

Aspect 119: The non-transitory computer-readable medium of any of aspects 113 through 118, where the instructions are further executable by the processor to: transmit, to the network entity, a capability message indicating one or more capabilities of the UE associated with determining a timer value for the beam failure timer, where the timer value for the beam failure timer is determined by the UE based on the one or more capabilities of the UE.

Aspect 120: The non-transitory computer-readable medium of aspect 119, where the instructions are further executable by the processor to: receive, from the network entity, a request to report the one or more capabilities of the UE, where transmitting the capability message is in response to receiving the request.

Aspect 121: The non-transitory computer-readable medium of any of aspects 119 through 120, where the one or more capabilities of the UE include a capability of the UE to determine the timer value for the beam failure timer, a capability associated with using ML models to determine the timer value for the beam failure timer, a processing power of the UE, a processing capacity of the UE, a memory storage of the UE, computation resources available to the UE for using the ML models, or a combination thereof.

Aspect 122: The non-transitory computer-readable medium of any of aspects 113 through 121, where the instructions are further executable by the processor to: receive, from the network entity, a message that activates determination by the UE of timer values for beam failure timers for one or more beam failure procedures, the one or more beam failure procedures including the beam failure procedure, where a timer value for the beam failure timer is determined by the UE in response to receiving the message.

Aspect 123: The non-transitory computer-readable medium of aspect 122, where the instructions are further executable by the processor to: transmit, to the network entity, a request to activate the determination of the timer values for the beam failure timers for the one or more beam failure procedures, where receiving the message is in response to transmitting the request.

Aspect 124: The non-transitory computer-readable medium of any of aspects 122 through 123, where the instructions are further executable by the processor to: receive, from the network entity, a second message that deactivates determination by the UE of timer values for beam failure timers for one or more second beam failure procedures; and perform a second beam failure procedure of the one or more second beam failure procedures in accordance with a second beam failure timer, where a second timer value for the second beam failure timer is configured by the network entity.

Aspect 125: The non-transitory computer-readable medium of aspect 124, where the instructions are further executable by the processor to: transmit, to the network entity, a request to deactivate the determination of the timer values for the beam failure timers for the one or more second beam failure procedures, where receiving the second message is in response to transmitting the request.

Aspect 126: The non-transitory computer-readable medium of any of aspects 113 through 125, where the instructions are further executable by the processor to: receive, from the network entity, one or more control messages indicating one or more ML models for beam failure timer value determination, one or more mappings that map parameters associated with the beam failure procedure to timer values of beam failure timers, or a combination thereof, the beam failure timer determined using an ML model of the one or more ML models or a mapping of the one or more mappings.

Aspect 127: The non-transitory computer-readable medium of aspect 126, where the instructions are further executable by the processor to: receive, from the network entity, an indication for the UE to use the ML model or the mapping.

Aspect 128: The non-transitory computer-readable medium of any of aspects 113 through 125, where one or more ML models for beam failure timer value determination, one or more mappings that map parameters associated with the beam failure procedure to timer values of beam failure timers, or a combination thereof, are configured at the UE during a factory setup of the UE, the beam failure timer determined using an ML model of the one or more ML models or a mapping of the one or more mappings.

Aspect 129: The non-transitory computer-readable medium of any of aspects 113 through 128, where the beam failure procedure includes a BFD procedure, and the instructions are further executable by the processor to: determine, by the UE, a first timer value for a first BFD timer used in counting a first type of BFI during the BFD procedure; and determine, by the UE, a second timer value for a second BFD timer used in counting a second type of BFI during the BFD procedure, where the beam failure timer corresponds to the first BFD timer or the second BFD timer based on a type of BFI counted during the BFD procedure.

Aspect 130: The non-transitory computer-readable medium of any of aspects 113 through 128, where the beam failure procedure includes a BFD procedure, and where the instructions to perform the beam failure procedure are executable by the processor to: generate a set of BFIs in response to receiving the one or more reference signals, where generating a threshold quantity of BFIs prior to an expiration of the beam failure timer indicates beam failure.

Aspect 131: The non-transitory computer-readable medium of any of aspects 113 through 130, where the instructions to perform the beam failure procedure are executable by the processor to: perform one or more CFRA procedures prior to an expiration of the beam failure timer.

Aspect 132: The non-transitory computer-readable medium of aspect 131, where the instructions to perform the beam failure procedure are executable by the processor to: perform one or more CBRA procedures prior after the expiration of the beam failure timer based on failing to re-establish a connection with the network entity via the one or more CFRA procedures.

Aspect 133: A non-transitory computer-readable medium storing code for wireless communication at a network entity, the code including instructions executable by a processor to: transmit, to a UE, an indication of one or more configurations for determination, by the UE, of one or more timer values for one or more beam failure timers associated with a beam failure procedure; and transmit, to the UE, one or more reference signals for measurement by the UE as part of the beam failure procedure.

Aspect 134: The non-transitory computer-readable medium of aspect 133, where: the one or more configurations for the determination include one or more ML models for beam failure timer value determination.

Aspect 135: The non-transitory computer-readable medium of aspect 133, where the one or more configurations for the determination include one or more mappings that map parameters associated with the beam failure procedure to timer values of beam failure timers.

Aspect 136: The non-transitory computer-readable medium of any of aspects 133 through 135, where the instructions are further executable by the processor to: receive, from the UE, a capability message indicating one or more capabilities of the UE associated with determining the one or more timer values for the one or more beam failure timers, where the one or more configurations for the determination are based on the one or more capabilities of the UE.

Aspect 137: The non-transitory computer-readable medium of aspect 136, where the instructions are further executable by the processor to: transmit, to the UE, a request to report the one or more capabilities of the UE, where receiving the capability message is in response to transmitting the request.

Aspect 138: The non-transitory computer-readable medium of any of aspects 133 through 137, where the instructions are further executable by the processor to: transmit, to the UE, a message that activates the determination, by the UE, of the one or more timer values for the one or more beam failure timers.

Aspect 139: The non-transitory computer-readable medium of any of aspects 133 through 138, where the instructions are further executable by the processor to: transmit, to the UE, a message that deactivates the determination, by the UE, of the one or more timer values for the one or more beam failure timers.

Aspect 140: The non-transitory computer-readable medium of any of aspects 133 through 139, where the beam failure procedure includes a BFD procedure or a BFR procedure.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communications, comprising:
 a first interface configured to:
  obtain, for a user equipment (UE) and from a network entity, one or more reference signals in accordance with a configuration associated with a beam failure procedure; and
 a processing system configured to:
  perform the beam failure procedure, the beam failure procedure comprising initiating a beam failure timer in response to one or more measurements of the one or more reference signals by the UE, wherein the beam failure timer is autonomously determined by the UE using at least one of a machine learning (ML)

model by inputting a set of parameters associated with the beam failure procedure into the ML model or a mapping that maps the set of parameters to a timer value for the beam failure timer and the beam failure timer includes one of a beam failure detection (BFD) timer or a beam failure recovery (BFR) timer.

2. The apparatus of claim 1, wherein the processing system is further configured to:
determine, by the UE, a timer value for the beam failure timer using the ML model.

3. The apparatus of claim 1, wherein the set of parameters associated with the beam failure procedure comprises a signal-to-interference-plus noise ratio (SINR) associated with communications between the UE and the network entity, a reference signal received power (RSRP) associated with the communications, a signal-to-noise ratio (SNR) associated with the communications, a quantity of beam failure indicators (BFIs) generated by the UE within a past duration, a quantity of available preambles for performing a contention free random access (CFRA) procedure, or a combination thereof.

4. The apparatus of claim 1, wherein the set of parameters associated with the beam failure procedure comprise a signal-to-interference-plus-noise ratio (SINR) associated with communications between the UE and the network entity, a reference signal received power (RSRP) associated with the communications, a signal-to-noise ratio (SNR) associated with the communications, a quantity of beam failure indicators (BFIs) generated by the UE within a past duration, a quantity of available preambles for performing a contention free random access (CFRA) procedure, or a combination thereof.

5. The apparatus of claim 1, further comprising:
a second interface, wherein the first interface or the second interface is configured to:
output, from the UE to the network entity, a capability message indicating one or more capabilities of the UE associated with determining a timer value for the beam failure timer, wherein the timer value for the beam failure timer is determined by the UE based at least in part on the one or more capabilities of the UE.

6. The apparatus of claim 5, wherein the first interface is further configured to:
obtain, for the UE from the network entity, a request to report the one or more capabilities of the UE, wherein the first interface or the second interface is configured to output the capability message in response to obtaining the request.

7. The apparatus of claim 5, wherein the one or more capabilities of the UE comprise a capability of the UE to determine the timer value for the beam failure timer, a capability associated with using ML models, including the ML model, to determine the timer value for the beam failure timer, a processing power of the UE, a processing capacity of the UE, a memory storage of the UE, computation resources available to the UE for using the ML models, or a combination thereof.

8. The apparatus of claim 1, wherein the first interface is further configured to:
obtain, for the UE from the network entity, a message that activates determination by the UE of timer values for beam failure timers for one or more beam failure procedures, the one or more beam failure procedures comprising the beam failure procedure, wherein the processing system is configured to determine a timer value for the beam failure timer by the UE in response to receiving the message.

9. The apparatus of claim 8, further comprising:
a second interface, wherein the first interface or the second interface is configured to:
output, from the UE to the network entity, a request to activate the determination of the timer values for the beam failure timers for the one or more beam failure procedures, wherein the first interface is configured to obtain the message is in response to outputting the request.

10. The apparatus of claim 8, wherein:
the first interface is further configured to:
obtain, for the UE from the network entity, a second message that deactivates determination by the UE of timer values for beam failure timers for one or more second beam failure procedures; and
the processing system is further configured to:
perform a second beam failure procedure of the one or more second beam failure procedures in accordance with a second beam failure timer, wherein a second timer value for the second beam failure timer is configured by the network entity.

11. The apparatus of claim 10, further comprising:
a second interface, wherein the first interface or the second interface is configured to:
output, from the UE to the network entity, a request to deactivate the determination of the timer values for the beam failure timers for the one or more second beam failure procedures, wherein the first interface is configured to obtain the second message in response to outputting the request.

12. The apparatus of claim 1, wherein the first interface is further configured to:
obtain, for the UE from the network entity, one or more control messages indicating one or more machine learning (ML) models, including the ML model, for beam failure timer value determination, one or more mappings, including the mapping, that map parameters associated with the beam failure procedure to timer values of beam failure timers, or a combination thereof, the beam failure timer determined using the ML model of the one or more ML models or the mapping of the one or more mappings.

13. The apparatus of claim 12, wherein the first interface is further configured to:
obtain, for the UE from the network entity, an indication for the UE to use the ML model or the mapping.

14. The apparatus of claim 1, wherein one or more ML models, including the ML model, for beam failure timer value determination, one or more mappings, including the mapping, that map parameters associated with the beam failure procedure to timer values of beam failure timers, or a combination thereof, are configured at the UE during a factory setup of the UE, the beam failure timer determined using the ML model of the one or more ML models or the mapping of the one or more mappings.

15. The apparatus of claim 1, wherein:
the beam failure procedure comprises a BFD procedure; and
the processing system is further configured to:
determine, by the UE, a first timer value for a first BFD timer used in counting a first type of beam failure indicator (BFI) during the BFD procedure; and
determine, by the UE, a second timer value for a second BFD timer used in counting a second type of BFI during the BFD procedure, wherein the beam failure timer corresponds to the first BFD timer or the second BFD timer based at least in part on a type of BFI counted during the BFD procedure.

16. The apparatus of claim 1, wherein:
the beam failure procedure comprises a BFD procedure; and
to perform the beam failure procedure, the processing system is configured to:
generate a set of beam failure indicators (BFIs) in response to obtaining the one or more reference signals, wherein generating a threshold quantity of BFIs prior to an expiration of the beam failure timer indicates beam failure.

17. The apparatus of claim 1, further comprising:
the beam failure procedure comprises a BFR procedure; and
to perform the beam failure procedure, the processing system is configured to:
performing one or more contention free random access (CFRA) procedures prior to an expiration of the beam failure timer.

18. The apparatus of claim 17, wherein, to perform the beam failure procedure, the processing system is further configured to:
perform one or more contention based random access (CBRA) procedures after the expiration of the beam failure timer based at least in part on failing to re-establish a connection with the network entity via the one or more CFRA procedures.

19. An apparatus for wireless communications, comprising:
a first interface configured to:
output, from a network entity to a user equipment (UE), an indication of one or more configurations for autonomous determination, by the UE, of one or more timer values for one or more beam failure timers associated with a beam failure procedure, wherein the one or more configurations comprise at least one of a machine learning (ML) model including an inputted set of parameters associated with determining the timer values for the beam failure timers associated with the beam failure procedure or a mapping that maps the set of parameters associated with the beam failure procedure to the timer values of the beam failure timers; and
output, from the network entity to the UE, one or more reference signals for measurement by the UE as part of the beam failure procedure.

20. The apparatus of claim 19, wherein the one or more configurations for the determination comprise ML models, including the ML model, for beam failure timer value determination.

21. The apparatus of claim 19, wherein the one or more configurations for the determination comprise one or more mappings, including the mapping.

22. The apparatus of claim 19, further comprising:
a second interface, wherein the first interface or the second interface is configured to:
obtain, by the network entity from the UE, a capability message indicating one or more capabilities of the UE associated with determining the one or more timer values for the one or more beam failure timers, wherein the one or more configurations for the determination are based at least in part on the one or more capabilities of the UE.

23. The apparatus of claim 22, wherein the first interface is further configured to:
output, from the network entity to the UE, a request to report the one or more capabilities of the UE, wherein the first interface or the second interface is configured to obtain the capability message in response to outputting the request.

24. A method for wireless communication at a user equipment (UE), comprising:
receiving, from a network entity, one or more reference signals in accordance with a configuration associated with a beam failure procedure; and
performing the beam failure procedure, the beam failure procedure comprising initiating a beam failure timer in response to one or more measurements of the one or more reference signals by the UE, wherein the beam failure timer is determined autonomously by the UE using at least one of a machine learning (ML) model by inputting a set of parameters associated with the beam failure procedure into the ML model or a mapping that maps the set of parameters to a timer value for the beam failure timer and the beam failure timer includes one of a beam failure detection (BFD) timer or a beam failure recovery (BFR) timer.

25. The method of claim 24, further comprising:
determining, by the UE, a timer value for the beam failure timer using the machine learning (ML) model.

26. A method for wireless communication at a network entity, comprising, comprising:
transmitting, to a user equipment (UE), an indication of one or more configurations for autonomous determination, by the UE, of one or more timer values for one or more beam failure timers associated with a beam failure procedure, wherein the one or more configurations comprise at least one of a machine learning (ML) model including an inputted set of parameters associated with determining the timer values for the beam failure timers associated with the beam failure procedure or a mapping that maps the set of parameters associated with the beam failure procedure to the timer values of the beam failure timers; and
transmitting, to the UE, one or more reference signals for measurement by the UE as part of the beam failure procedure.

27. The method of claim 26, wherein the one or more configurations for the determination comprise ML models, including the ML model, for beam failure timer value determination.

* * * * *